US012011699B2

(12) United States Patent
Megyeri

(10) Patent No.: US 12,011,699 B2
(45) Date of Patent: Jun. 18, 2024

(54) MIXING APPARATUS AND MIXING SYSTEM FOR MIXING FLUIDS

(71) Applicant: M AND M PRODUCTIONS KFT., Budapest (HU)

(72) Inventor: Gábor Megyeri, Miskolc (HU)

(73) Assignee: M AND M PRODUCTIONS KFT., Budapest (HU)

( * ) Notice: Subject to any disclaimer, the term of this patent is extended or adjusted under 35 U.S.C. 154(b) by 954 days.

(21) Appl. No.: 17/252,322

(22) PCT Filed: Dec. 19, 2018

(86) PCT No.: PCT/HU2018/000059

§ 371 (c)(1),
(2) Date: Dec. 15, 2020

(87) PCT Pub. No.: WO2019/122940

PCT Pub. Date: Jun. 27, 2019

(65) Prior Publication Data

US 2021/0260544 A1 Aug. 26, 2021

(30) Foreign Application Priority Data

Dec. 20, 2017 (HU) .................................... P1700536

(51) Int. Cl.
*B01F 33/40* (2022.01)
*B01F 31/20* (2022.01)
(Continued)

(52) U.S. Cl.
CPC ............ *B01F 33/403* (2022.01); *B01F 31/20* (2022.01); *B01F 33/846* (2022.01); *B01F 35/83* (2022.01); *B01F 2101/35* (2022.01)

(58) Field of Classification Search
CPC ...... B01F 23/60; B01F 2101/35; B01F 35/83; B01F 33/846; B01F 31/20; B01F 33/403
See application file for complete search history.

(56) References Cited

U.S. PATENT DOCUMENTS

2009/0228143 A1* 9/2009 Hughes ................. B01F 33/846
700/239
2013/0338821 A1 12/2013 Igarashi
(Continued)

FOREIGN PATENT DOCUMENTS

DE 202007002055 U1 4/2007
EP 1439000 A2 7/2004
(Continued)

OTHER PUBLICATIONS

European Patent Office, International Search Report and Written Opinion in PCT Application No. PCT/HU2018/000059, dated Jun. 19, 2019.

*Primary Examiner* — Jason K Niesz
(74) *Attorney, Agent, or Firm* — Wood Herron & Evans LLP

(57) ABSTRACT

A mixing apparatus for mixing fluids, in particular inks of different colours for fountain pens, the mixing apparatus comprising containers (12*a*-12*d*), each adapted for storing a fluid, a tube element (13*a*-13*e*), for each container (12*a*-12*d*), connected to the container (12*a*-12*d*) and having a dispensing end portion at its end being opposite the container (12*a*-12*d*), a fluid feed device adapted for dispensing fluid from the containers (12*a*-12*d*) via the dispensing end portions, and a mixing space part encasing element (45) having a mixing space part in its inner space, the dispensing end portions of the tube elements (13*a*-13*e*) are arranged to extend into the mixing space part, and a filling unit (10) having a base portion (44) and a neck portion (40) adapted for holding the mixing space part encasing element (45), and the base portion (44) and the neck portion (40) are configured to be movable relative to each other, and are adapted for encompassing a container (25) being connectible to the fluid discharge portion. The invention is furthermore a mixing system for mixing fluids comprising a data entry unit (200),
(Continued)

a control unit, and the mixing apparatus. The invention is furthermore a fountain pen (100) comprising a container (25) adapted for storing ink which is filled up applying the mixing apparatus.

16 Claims, 17 Drawing Sheets

(51) Int. Cl.

| | |
|---|---|
| ***B01F 33/84*** | (2022.01) |
| ***B01F 35/83*** | (2022.01) |
| *B01F 101/35* | (2022.01) |

(56) References Cited

U.S. PATENT DOCUMENTS

| | | | | |
|---|---|---|---|---|
| 2015/0021356 | A1 | 1/2015 | Witchell et al. | |
| 2016/0067659 | A1* | 3/2016 | Williams ................ | B01F 25/44<br>366/150.1 |
| 2016/0082403 | A1 | 3/2016 | Ounzar | |
| 2018/0125207 | A1* | 5/2018 | Shami ................... | B01F 33/841 |

FOREIGN PATENT DOCUMENTS

| | | | |
|---|---|---|---|
| EP | 3162586 | A1 | 5/2017 |
| GB | 2268419 | A | 1/1994 |

* cited by examiner

MIXING APPARATUS AND MIXING SYSTEM FOR MIXING FLUIDS

TECHNICAL FIELD

The invention relates to a mixing apparatus and a mixing system adapted for mixing fluids, in particular different coloured inks, and to a fountain pen comprising a collector container filled utilizing the apparatus or the system.

BACKGROUND ART

Mixing colours, or the faithful rendering of a particular colour is a challenge often faced nowadays. Accordingly, a number of approaches for mixing colours and/or paints are known.

In US 2013/0338821 A1 an apparatus and method is disclosed wherein colour information is collected (for example, of a patient's skin) applying some type of spectrophotometer (however, in the exemplary implementation a web camera is applied that is not particularly well suited for obtaining the colour), and after establishing the skin colour, a cosmetic material of the appropriate colour is produced by mixing. Mixing is carried out by feeding the appropriate quantities of material into a common container from containers holding the appropriate components. The support mechanism adapted for moving the common container under the dispensers (the finished mixture is poured into the suitable container) is shown in FIG. 1A of the document; according to FIG. 6 of the document the common container is a cosmetic vial that has a shape matching the support mechanism. The above presented known apparatus is therefore adapted, for example, for mixing cosmetic materials having a creamy consistency.

In US 2015/0021356 A1, an apparatus for mixing (preparing by mixing) a hair dye is disclosed wherein the source material is conveyed from a plurality of containers into a common container via tubes, the hair dye being prepared by mixing therein. In the illustrated arrangement, the components are conveyed applying dispensers into a bowl opened from the top, functioning as the common container. If necessary, the dispensed material is subjected to stirring by the operator.

A similar mixing apparatus is disclosed in US 2016/0082403 A1, wherein the source materials are introduced by dispensers into a common mixing bowl.

A paint mixing apparatus is disclosed also in GB 2268419 A. The apparatus is arranged to convey paint material into a common bowl via syringes from containers holding different colour paints. The applied common bowl is illustrated in FIG. 3 of the document; the insertion and fill-up positions of the common bowl are illustrated in FIG. 1 of the document. As it can be discerned from the illustration, the different components are simply poured into a high container through the top opening thereof.

The common disadvantage of the above presented technical approaches is that the mixed fluid is collected in an open collector bowl, mixing being carried out in the collector bowl itself.

In view of the known approaches, there is a demand for a mixing apparatus and mixing system that fulfills the objectives set before it more efficiently compared to the known approaches.

DESCRIPTION OF THE INVENTION

The primary object of the invention is to provide a mixing apparatus and mixing system which is free of disadvantages of prior art approaches to the greatest possible extent.

An object of the invention is to provide a mixing apparatus and mixing system that has a configuration allowing for more efficient operation compared to known approaches, such that it is suitable for dispensing the particular fluids (e.g. inks) precisely, preferably provides improved protection for the different coloured fluids against drying out, preferably enjoys improved protection against wasting source materials (e.g. due to leaks), and preferably provides improved mixing efficiency.

A further object of the invention is to provide a mixing apparatus and mixing system that can be implemented more ergonomically compared to known approaches, providing an improved aesthetic appearance and a relatively compact design.

The objects of the invention can be achieved by the mixing apparatus according to claim 1, the mixing system according to claim 16, and the fountain pen according to claim 17. Preferred embodiments of the invention are defined in the dependent claims.

The mixing apparatus and mixing system according to the invention is adapted basically for mixing different coloured inks (typically the base colours of a widely applied colour space), and in the case of the mixing apparatus according to the invention, typically for mixing (preparing by mixing) an ink having a colour corresponding to a preselected colour. Utilizing the commonly applied colour spaces (for example, the CMYK colour space) is preferable because any arbitrarily chosen colour can be mixed from the base colours of these colour spaces. A colourless ink may also be preferably applied together with the colours of these known colour spaces. Applying the mixing apparatus and mixing system according to the invention it can be provided that any colour of a colour palette (for example the Pantone colour palette) can be mixed utilizing fountain pen inks.

BRIEF DESCRIPTION OF THE DRAWINGS

Preferred embodiments of the invention are described below by way of example with reference to the following drawings, where.

MODES FOR CARRYING OUT THE INVENTION

Figure 1:
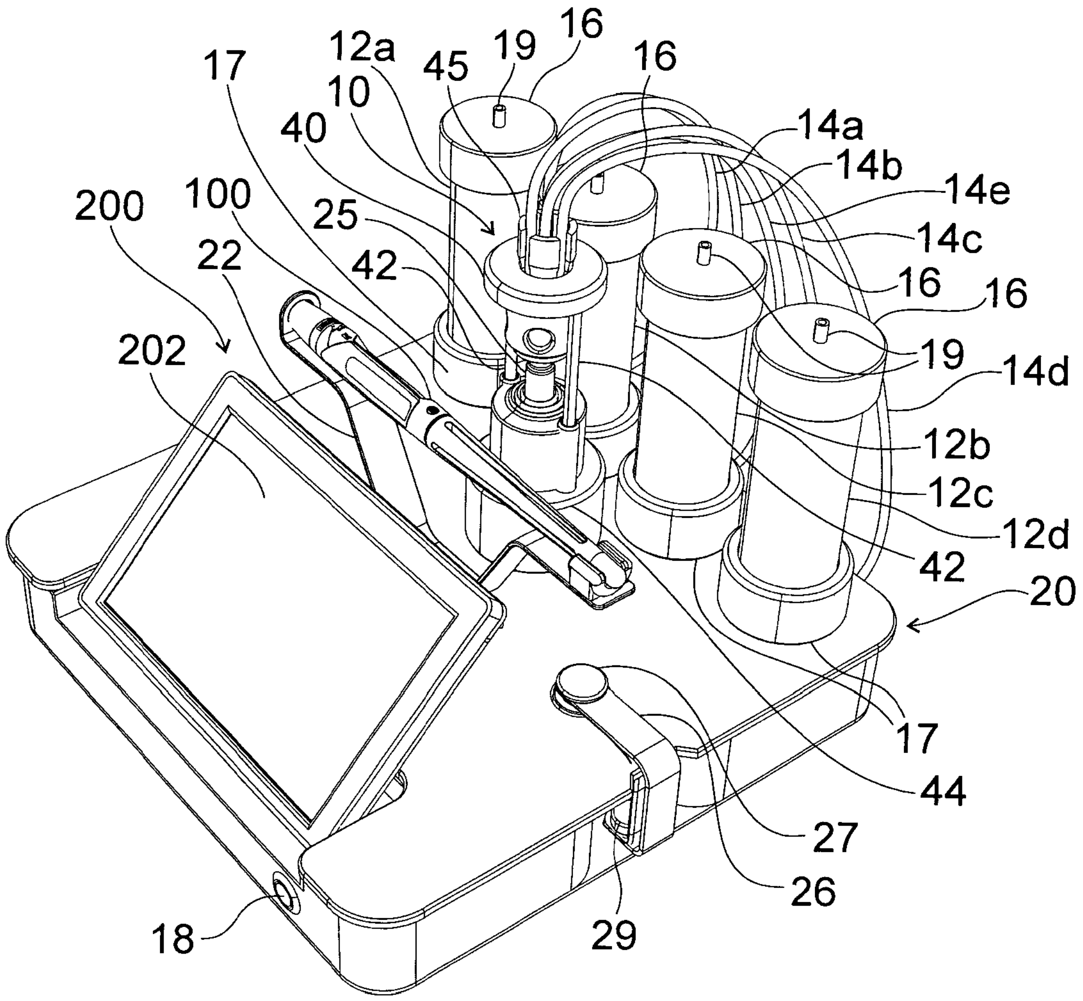
FIG. 1 is a spatial drawing of an embodiment of the mixing apparatus according to the invention.

The mixing apparatus (fluid mixing apparatus) according to the invention is adapted for mixing fluids, preferably for producing a mixture of a desired colour by mixing fluids of different colours, in particular for mixing inks of different colours. Some embodiments of the invention therefore relate to a mixing apparatus, while other embodiments relate to a mixing system that comprises an embodiment of the mixing apparatus according to the invention and a data entry unit. FIG. 1 shows an embodiment of the mixing system and thus, the mixing apparatus according to the invention. First, the mixing apparatus is disclosed (see below for the mixing system in detail).

Figure 19A:
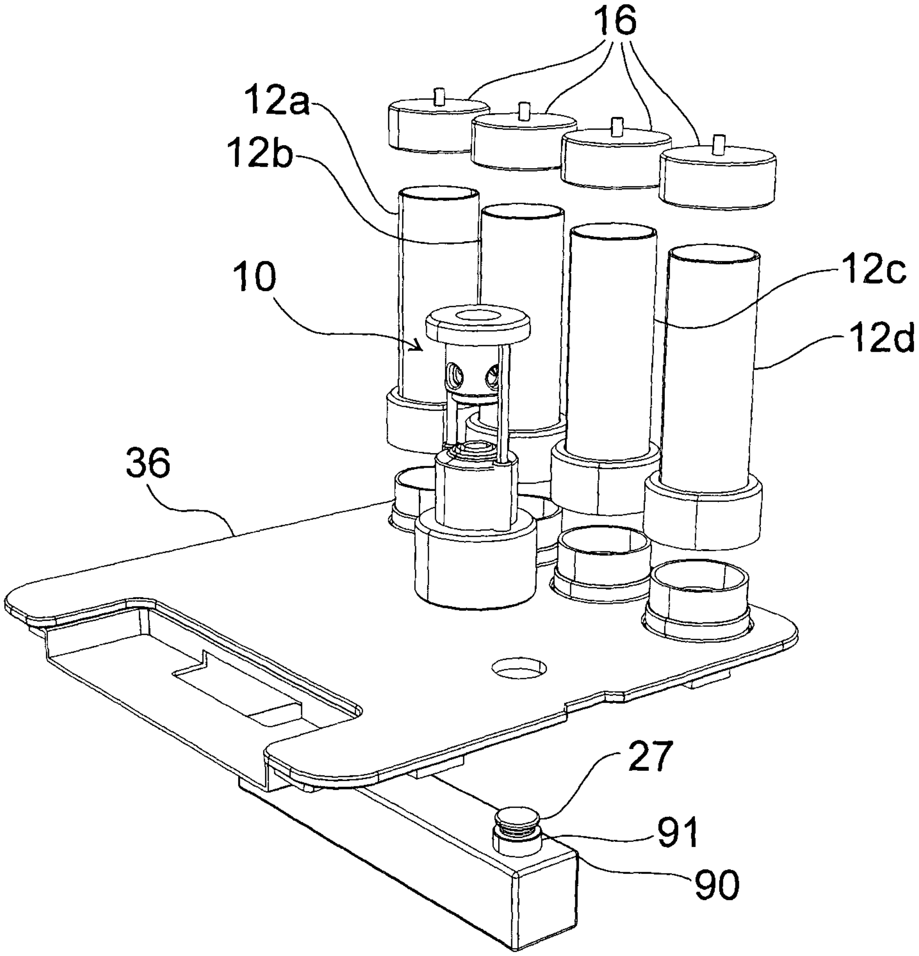
FIG. 19A is an exploded view showing the arrangement of the container comprising colourless fluid applied in the embodiment of FIG. 1.

In the embodiment shown in FIG. 1 the mixing apparatus comprises containers 12_a_, 12_b_, 12_c_, 12_d_, 90, each adapted for storing a fluid (for a preferred arrangement of the container 90 according to this embodiment see FIG. 19A), a tube element 13_a_, 13_b_, 13_c_, 13_d_, 13_e_, for each container 12_a_, 12_b_, 12_c_, 12_d_, 90, connected to the container 12_a_, 12_b_, 12_c_, 12_d_, 90, and having a dispensing end portion at its end being opposite the container 12_a_, 12_b_, 12_c_, 12_d_, 90 (see FIG. 17A), and a fluid feed device (fluid feeding means, fluid dispensing means) adapted for dispensing (dispensing out, letting out) fluid from the containers 12_a_, 12_b_, 12_c_, 12_d_, 90 via the dispensing end portions (i.e. for dispensing fluid through the dispensing end portion from the container corresponding to the tube element having the particular dispensing end portion).

As it will become apparent below, in the embodiment according to the figures (see especially FIG. 17A) a respective separate fluid feed device (fluid feed means, for example, a peristaltic pump) is arranged for each tube element. In the illustrated embodiment therefore, preferably each tube element 13_a_, 13_b_, 13_c_, 13_d_, 13_e_ comprises a first tube element portion 15_a_, 15_b_, 15_c_, 15_d_, 15_e_ having a first end and a second end, and a second tube element portion 14_a_, 14_b_, 14_c_, 14_d_, 14_e_ having a third end and a fourth end, and the first tube element portions 15_a_, 15_b_, 15_c_, 15_d_, 15_e_ is connected to the respective containers 12_a_, 12_b_, 12_c_, 12_d_, 90 at their first end, the dispensing end portions are formed at the fourth end of the respective second tube element portions 14_a_, 14_b_, 14_c_, 14_d_, 14_e_, and the fluid feed device is connected to the second end of the respective first tube element portions 15_a_, 15_b_, 15_c_, 15_d_, 15_e_ and to the third end of the respective second tube element portions 14_a_, 14_b_, 14_c_, 14_d_, 14_e_ (i.e. each fluid feed device is inserted between the respective first and second tube element portions). The tube element portions have two ends interconnected by an internal channel adapted for carrying a fluid flow.

In the embodiment according to FIG. 1 the mixing apparatus further comprises a mixing space part encasing element 45 (mixing space part receiving member, mixing space part housing or mixing space part enclosure member) having a mixing space part (mixing space) in its inner space (see the configuration of a mixing space part 50 according to this embodiment in FIG. 4), and a fluid discharge portion 55 (see FIG. 4) connected to the mixing space part 50 and adapted for discharging fluid being (being present) in the mixing space part 50, and the dispensing end portions of the tube elements 13_a_, 13_b_, 13_c_, 13_d_, 13_e_ are arranged to extend into the mixing space part 50 (i.e. the end aperture of the dispensing end portion opens into the mixing space part 50). The tube element 13_a_ comprises a first tube element portion 15_a_ and a second tube element portion 14_a_ (see FIG. 17A), the portions of the tube elements 13_b_, 13_c_, 13_d_, 13_e_ being numbered analogously.

In the embodiment according to FIG. 1 the mixing apparatus further comprises a filling unit 10 having a base portion 44 and a neck portion 40, the neck portion 40 is adapted for holding the mixing space part encasing element 45 (member), and the base portion 44 and the neck portion 40 are configured to be movable relative to each other, and are adapted for encompassing (i.e. clamping between them) a container 25 being connectible to the fluid discharge portion 55. In contrast to known approaches it is advantageous that in the mixing apparatus according to the invention the container can be arranged in the apparatus in a controlled, fixed manner allowing for introducing therein the mixed fluid without any loss, rather than applying an open-top mixing plate or mixing bowl.

Figure 11:
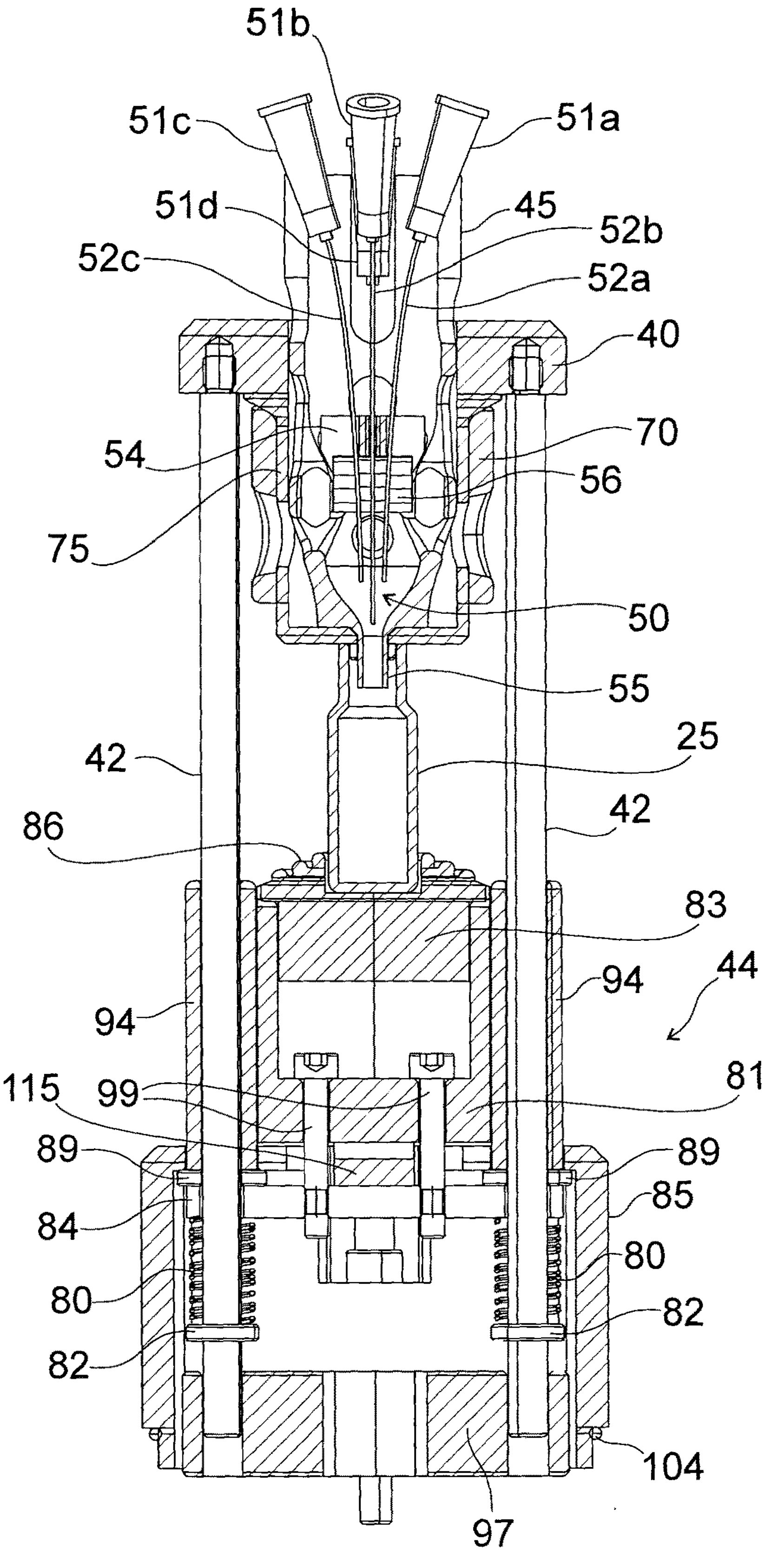
FIG. 11 shows the filling unit illustrated in the embodiment of FIG. 1 on a sectional view, arranging the filling elements in the mixing space part encasing element and the mixture collection container under the mixing space part.

The manner of interconnection of this embodiment of the fluid discharge portion 55 and the container 25 can be observed in FIG. 11; such a configuration may also be conceived wherein the fluid discharge portion is implemented simply as an opening arranged on the mixing space part encasing element (at the bottom thereof), to which the container is connected by placing it under the opening.

The filling unit 10 (i.e. this particular embodiment of the filling unit) is described in detail below. The filling unit 10 can be simply termed a holding means (device), mixing unit, or, based on its shape, even a tower unit; the term "filling unit" emphasizes that it is this unit (means) that is adapted for filling up the container 25 (and the mixing space part encasing element 45) with the fluid being mixed, while it is also adapted for holding the container. In this embodiment the container 25 is arranged between the base portion 44 and the neck portion 40 of the filling unit 10 (the mixed fluid being introduced into this container 25 from the mixing space part). As shown in FIG. 1, the base portion 44 and the neck portion 40 are preferably interconnected by rod elements 42 (in this embodiment, two rod elements 42 that can also be termed stems or stem elements). The container 25 does not form a part of the filling unit 10 because it is optional that the container 25 is arranged in the filling unit 10 or—for example a container which has just been filled up—it is removed from the filling unit and is inserted into a fountain pen. The container 25 is inserted when it is to be filled up, i.e. when the mixing apparatus is to be put into operation. In the out-of-use state of the mixing apparatus the container 25 is typically not arranged therein (in such a case it is expediently inserted only when it is to be prepared for a later fill-up). The container 25 therefore does not form a part of the mixing apparatus either, yet it can be optionally arranged therein.

In FIG. 1 four identically configured containers 12*a*, 12*b*, 12*c*, 12*d* are shown, and the container 90 is arranged inside a holding table 20. In this embodiment, therefore, mixing is performed utilizing the fluids held in these five containers. In this embodiment the mixing apparatus is applied for mixing a desired colour (preferably selected applying a data entry unit 200), and accordingly the colours of the CMYK colour space, i.e. cyan (gentian blue), magenta (purpure), yellow, and black (the latter being designated with the letter K referring to the term "key" colour), can be stored in the four identical containers 12*a*, 12*b*, 12*c*, 12*d* having a cylindrical configuration. In addition to that, the container 90, which in this embodiment is concealed inside the holding table 20, is adapted for storing a colourless fluid (the containers 12*a*, 12*b*, 12*c*, 12*d* all contain coloured fluids, i.e. inks).

In the illustrated embodiment these appropriately coloured and colourless fluids are inks, from which the ink with the desired colour can be obtained by mixing in the container 25 shown in FIG. 1 (that can also be termed a collector container or fluid container, or in certain embodiments, ink holder or ink container). In the fountain pen 100 shown in FIG. 1 the container 25 can be utilized as an ink cartridge. Thanks to the application of these colours, in this embodiment the mixing apparatus allows for mixing any colour of the Pantone colour palette (or another colour palette) from fountain pen inks.

The dimensions of the mixing apparatus and system are illustrated by an implementation example, in which the width and length dimensions of the holding table 20 are both 28 cm, the height of the arrangement in the same example being 20.5 cm as measured from the bottom surface of the holding table 20 to the top end of the mixing space part encasing element 45. Also, in this example the height of the filling unit 10 is, to a good approximation, 14 cm, the diameter of the rod element 42 is 0.5 cm, the external diameter of the containers 12*a*-12*d* is 4 cm, and the height of the assembly shown in FIG. 2B is 14.7 cm.

Figure 2A:
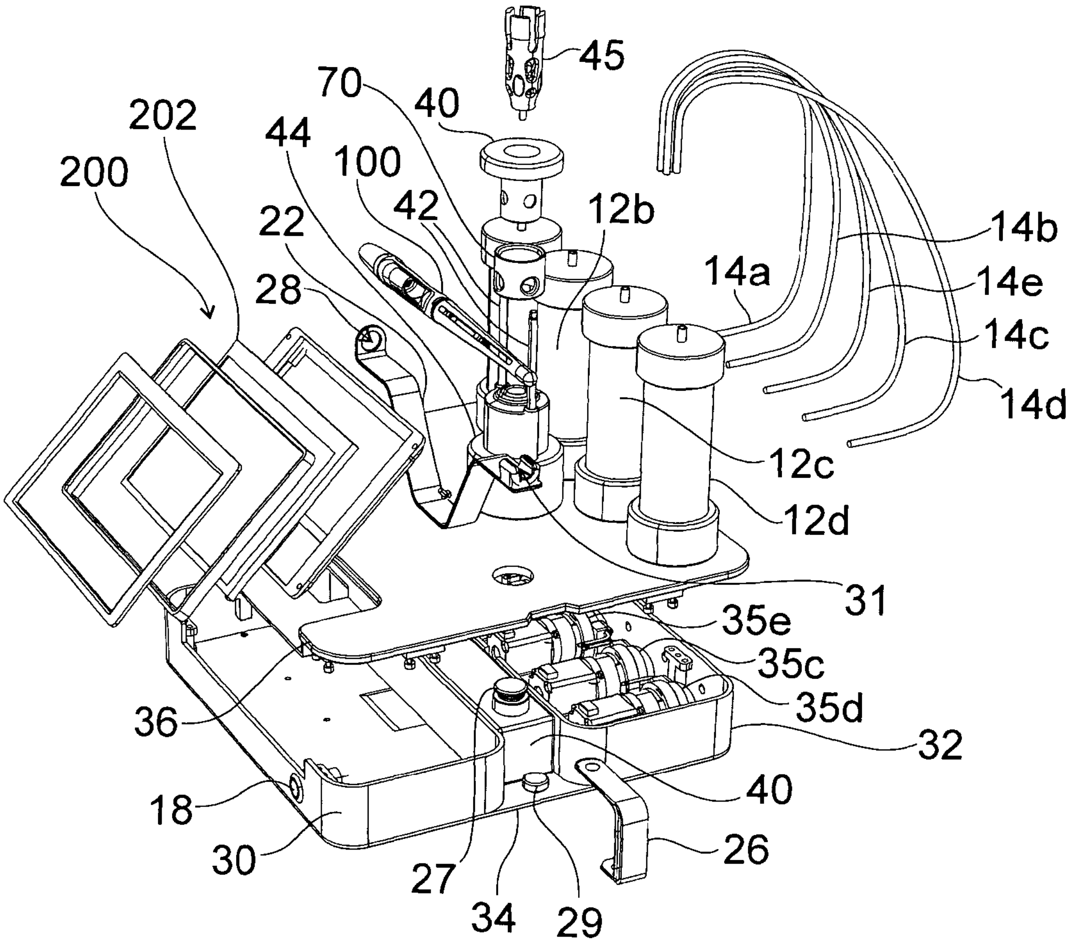
FIG. 2A is an exploded drawing of the embodiment of the mixing apparatus according to the invention shown in FIG. 1.
Figure 2B:
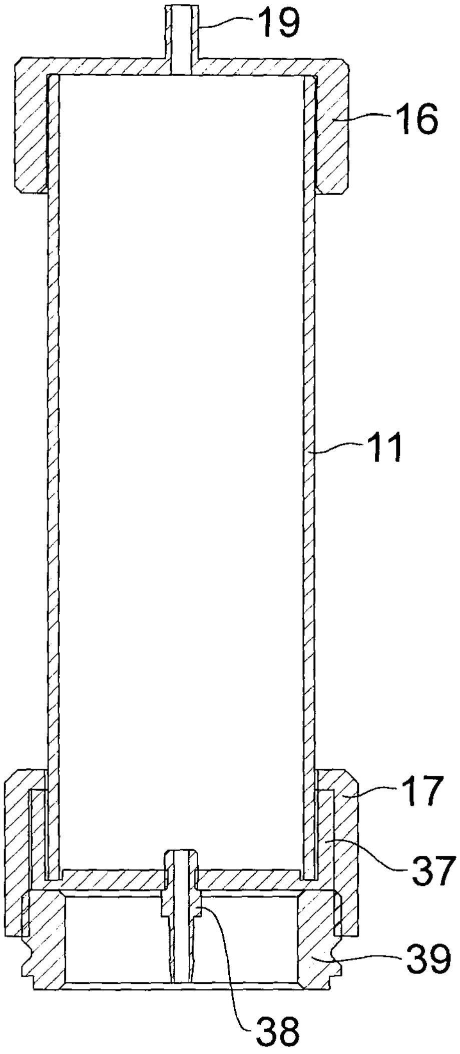
FIG. 2B is a sectional view of the container applied in the embodiment of the mixing apparatus according to the invention shown in FIG. 1.

The configuration and arrangement (applied in this embodiment) of the containers 12*a*, 12*b*, 12*c*, 12*d* shown in FIG. 1 is presented in relation to FIG. 2B; appropriate operation can also be provided by other configurations (i.e. applying such containers from which the fluid can be drained adequately). As shown in FIG. 1, the containers 12*a*, 12*b*, 12*c*, 12*d* are attached to the holding table 20 by fixation elements 17 (see also in FIG. 19A), and are each fitted with a respective container cover 16. In the container cover 16 there is formed an air flow passage 19 (breathing opening, or simply opening, air-leading-out passage), through which the air space above the fluid in the containers 12*a*, 12*b*, 12*c*, 12*d* is in contact with the environment surrounding the mixing apparatus. It is preferable to arrange the air flow passage 19 because on the market there are available inks that do not dry out during storage when exposed to air to such an extent, while at the same time the fluid feed device responsible for moving the fluid (for example, a peristaltic pump) is stressed much less if the fluid has to be dispensed from such a—not completely sealed—container (the pump has to do much less work). The fluid (ink) held in the containers 12*a*, 12*b*, 12*c*, 12*d* can be discharged via an opening formed at their bottom (for more details see FIG. 2B).

In this embodiment, therefore, the respective tube elements 13*a*, 13*b*, 13*c*, 13*d*, 13*e* are connected to the bottom portion of the corresponding containers 12*a*, 12*b*, 12*c*, 12*d* (and to the container 90). In the tube elements 13*a*, 13*b*, 13*c*, 13*d*, 13*e* there is inserted a respective peristaltic pump 35*a*, 35*b*, 35*c*, 35*d*, 35*e* (see FIGS. 2A and 17A) as a fluid feed device, and the tube elements 13*a*, 13*b*, 13*c*, 13*d*, 13*e* lead up to the filling unit 10 shown in FIG. 1 that performs the mixing of the fluids. In FIG. 1 there is shown the second tube element portion 14*a*, 14*b*, 14*c*, 14*d*, 14*e* of the tube element portions 13*a*, 13*b*, 13*c*, 13*d*, 13*e* (five tube elements corresponding to the five containers) which connects the pumps 35*a*, 35*b*, 35*c*, 35*d*, 35*e* with the dispensing end portion situated at the end of the tube element portions 14*a*, 14*b*, 14*c*, 14*d*, 14*e*. The dispensing end portions are arranged in the filling unit 10 (for the configuration applied in this embodiment see FIG. 4). The filling unit 10 is mounted to the cover plate 36 of the holding table 20 for example with screws. Of course, the number of tube elements and pumps included corresponds to the number of containers.

A fixing element 26 is shown in FIG. 1, of which one leg is attached by a screw element 29 to a bottom support plate 34 of the holding table 20, the other leg being attached to the cover element 27 of the container 90, resulting in the fixing element 26 being bent to a U-shape. The cover element 27 preferably has a threaded configuration. As shown in FIG. 2A, the cover element 27 is adapted for covering a filling opening 91 of the container 90 (see FIG. 19A), and can preferably be screwed into the filling opening 91. In the arrangement of FIG. 1 the cover element 27 is screwed into the filling opening 91 by passing it through the corresponding leg of the fixing element 26 and the cover plate 36.

In FIG. 1 there is also shown a fountain pen 100 arranged on a holding element 22, wherein the container 25 filled up utilizing the mixing apparatus can be applied as an ink cartridge. Accordingly, certain embodiments of the invention relate to a fountain pen comprising a container adapted for storing ink, and the container is filled up applying a mixing apparatus according to an embodiment of the invention. The configuration of the holding element 22 is shown in FIG. 2A, with the fountain pen 100 being removed from the holding element 22. Accordingly, the holding element 22 preferably has a U-shape having diverging legs, with retaining portions terminated in a holder opening 28 and a holder trough 31 being arranged at the end of the stems; the fountain pen 100 can be inserted by introducing it into the holder opening 28 and snapping it in the holder trough 31.

In FIG. 1 a data entry unit 200 (data entry means) is shown that preferably has a display 202. The display 202 is preferably a touch screen that allows data entry by touch.

The display 202 can show different colours from which the colour to be mixed applying the mixing apparatus can be selected. The display can show colour scales and even photographs in which a particular colour can be chosen. Accordingly, a "brought" colour can preferably also be selected from a photograph copied to the data entry unit 200 by the user. The display 202 and also further components of the mixing system, such as the mixing apparatus, can be put into operation utilizing a start button 18 situated on the front panel of the holding table 20.

Figure 17A:
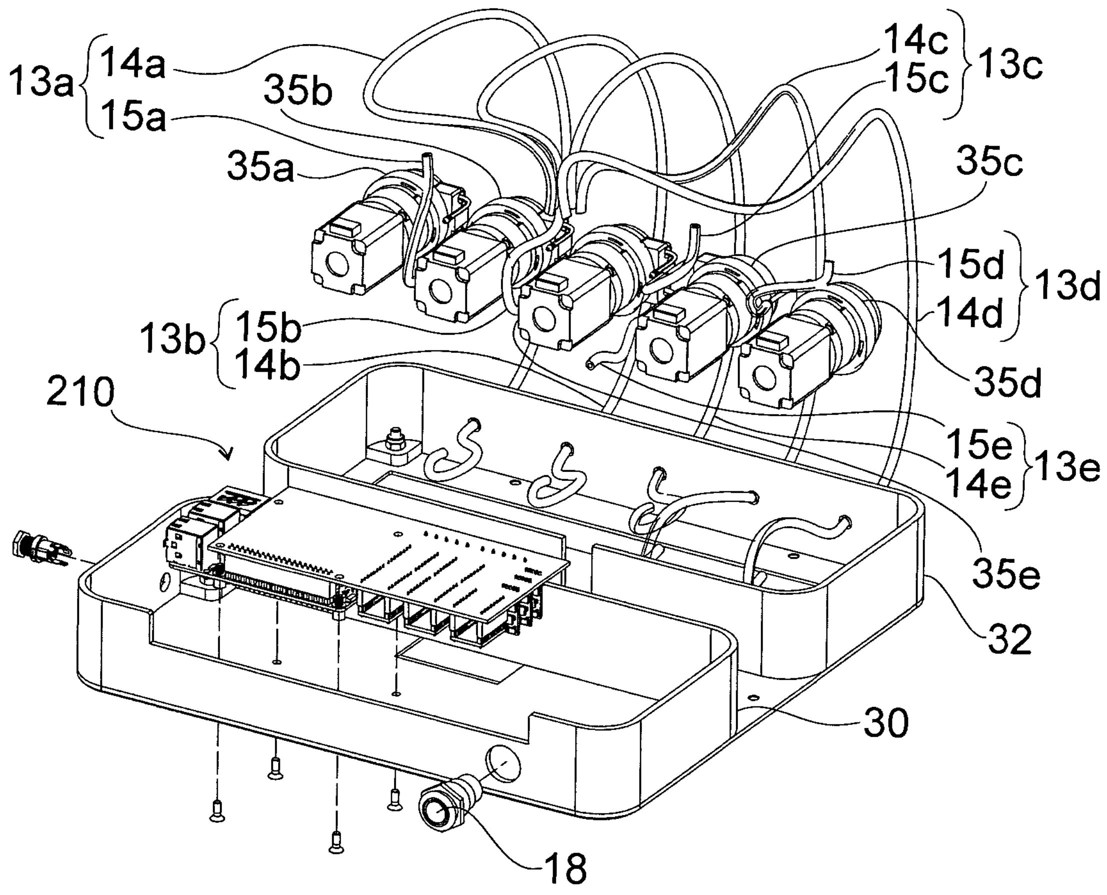
FIG. 17A is an exploded view showing the arrangement of tube elements in the embodiment of FIG. 1.

Certain embodiments of the invention therefore relate to a mixing system adapted for mixing fluids. In the embodiment shown in FIG. 1 the mixing system comprises a data entry unit 200 adapted for selecting a colour, and a control unit 210 (the control unit 210 is shown in FIG. 17A), and further comprises an embodiment of the mixing apparatus, and the fluid feed devices are controlled by the control unit 210 to feed such quantities of fluids into the mixing space part that allow for mixing the colour selected on (by) the data entry unit 200 (in order that the appropriate colour can be mixed, containers filled with fluids with the appropriate colours have to be provided).

The fluid feed device is therefore adapted for dispensing an appropriate quantity of fluid from the container to which that particular tube element is connected into which the given fluid feed device is inserted. Prior to and after the dispensing operation it prevents the fluid from being discharged through the free end of the tube element. The quantity to be dispensed (applying the fluid feed device) is preferably determined by the control unit. The fluid feed device could also be called a fluid transfer means.

The mixing apparatus can therefore be operated without the other components of the above described mixing system, applying solely the control means. In this case the data related to the colour to be mixed are available to the control means (optionally, the control means also computes the appropriate colour components itself) and performs the mixing operation required to prepare the colour by appropriately controlling the fluid feed device of the mixing apparatus (that is, the colour selection step, to be performed applying the data entry unit, can be left out).

Accordingly, therefore, a colour is preferably selected in the mixing system applying the data entry unit, subsequently controlling the fluid feed devices (e.g. peristaltic pumps) corresponding to the containers such that such quantities of fluid are introduced from the containers into the mixing space part that provide that the produced fluid mix has the previously selected colour. To achieve that, it is required to perform colour analysis of the selected colour, i.e. the control unit also performs the function of decomposing the selected colour to the colour components that are available in the containers. If the required colour components are available (i.e. the exact mix ratio of the different-colour fluids required for obtaining the desired colour has been determined), then, by appropriately controlling the peristaltic pumps the components of the appropriate colour are introduced from the containers into the mixing space part. In the illustrated embodiment a colourless fluid (ink) is also applied in addition to the appropriate coloured fluids (inks); the fluid quantities to be dispensed are of course computed by the control unit accordingly.

In the illustrated embodiment, the mixed fluid (ink of the appropriate colour) is introduced from the mixing space part to the container 25. According to this arrangement, if the holding table 20 is arranged on a horizontal surface, the mixed fluid simply flows into the container 25 from above. Subsequently, the filled-up container 25 can be inserted into the fountain pen 100 as an ink cartridge, after which the fountain pen 100, filled with the ink of the desired colour, is at disposal.

In FIG. 2A an exploded view of the embodiment illustrated in FIG. 1 is shown. In the exploded view of FIG. 2A the filling unit 10 is shown in a disassembled state. A mixing space part encasing element 45 adapted to be inserted into the neck portion 40, the air vent control element 70 (member) that can be arranged about the neck portion 40, and the base portion 44, with rod elements 42 protruding from it, can all be separately observed. These components of this embodiment of the filling unit 10 are illustrated in further figures.

Also, in the exploded view of FIG. 2A the tube element portions 14*a*, 14*b*, 14*c*, 14*d*, 14*e* are illustrated separately. Being passed through openings formed on the backside of the pump housing 32 (second mounting enclosure) shown in FIG. 2A, the tube element portions 14*a*, 14*b*, 14*c*, 14*d*, 14*e* lead from the peristaltic pumps 35*a*, 35*b*, 35*c*, 35*d*, 35*e* to the mixing space part encasing element 45 (this is illustrated by the curved tube arrangement shown in the figure). Of the included pumps, the pumps 35*c*, 35*d*, 35*e* can be seen in the pump housing 32 situated on the support plate 34.

An electronics housing 30 (a first mounting enclosure) is shown in FIG. 2A, with a start button 18 being arranged on the side wall thereof. As shown in FIG. 17A, a control unit 210 is arranged in the electronics housing 30. In FIG. 2A the cover plate 36 is removed from further portions of the holding table 20 (that is why the inner space of the electronics housing 30 and the pump housing 32 is shown), with the fixing element 26 also being shown in a released state. In FIG. 2A the data entry unit 200 is also illustrated in an exploded view such that the components thereof can be observed (from back to front in the figure): display back cover, display 202, display frame, and display front cover.

In FIG. 2B one of the containers 12*a*-12*d* is shown in a sectional view together with the components attached thereto. As shown in FIG. 2B, the container cover 16 is pulled in a cap-like fashion over a container wall 11 (a threaded connection can also be applied here). In FIG. 2B there can be clearly seen an air flow passage 19 preferably formed on the container cover 16. The air flow passage 19 is formed on a protrusion extending from the container cover 16. A refill is necessary when the quantity of any of the fluids falls below a critical level. The containers 12*a*, 12*b*, 12*c*, 12*d* (e.g., coloured ink containers) can be filled up by removing the container cover 16 (i.e. their top), while the container 90 (e.g., a colourless ink container) can be filled up by removing the cover element 27 (by unscrewing the sealing plug).

In the arrangement of FIG. 2B the container wall 11 is closed at the bottom by a closing end portion 37 that, like the container cover 16, has a cap-like configuration (with a cylindrical side surface portion and a flat top portion). As it is illustrated in FIG. 2B, the container wall 11 is seated in a circumferential groove; the closing end portion 37 is preferably adhesively attached to the container wall 11. Optionally, a threaded connection can be applied on this end as well. Because, however, the container wall 11 is preferably made, for example, of glass (such that the coloured fluid held therein can be seen from the outside, which lends a pleasing appearance to the mixing apparatus), then it can be difficult to prepare a thread into it. The container wall 11 may also be made of plexi or other (transparent) plastic.

An outlet element 38 (outlet stub), through which fluid can leave the container, is inserted into the closing end portion 37. At the connection portion of the outlet element 38, preferably a sealing element is arranged around the outlet element 38. The outlet element 38 can be adhesively bonded into the closing end portion 37 applying screw sealing adhesive. As shown in FIG. 2B, the portion of the outlet element 38 protruding from the container is configured such that the tube element adapted for discharging the fluid can be pulled over it. In FIG. 2B a ring-shaped connection element 39 (member) is shown, with the fixation ring 17 being connected by threads to the upper portion thereof. The connection element 39 is preferably mounted to the holding table 20. The container cannot be fully discharged through the outlet element 38 utilizing the pumps. To achieve a complete discharge, the attachment of the containers to the holding table 20 has to be released, after which the containers can be removed and their contents can be discharged manually. With the containers 12*a*-12*d* holding for example coloured inks this can be performed in a simpler manner, but the container 90 holding for example colourless ink can only be discharged by dismounting it after removing the cover plate 36 (which can be made of glass in order to show the internal components).

The details of the special configuration of a connection element 39 shown in FIG. 2B are the following. The narrower portion shown at the bottom of the figure is inserted into the cover of the pump housing 32, while the connection element 39 (with a sealing ring being preferably arranged around it) is seated into the cover plate by way of a circumferential (V-cross section) groove. Therefore, after removing the fixation element 17, the remaining portions of the container (together with the closing end portion 37) can also be removed from the connection element 39.

In FIGS. 3A-3D the embodiment of the mixing apparatus according to FIG. 1 is shown in various different views, with certain components (primarily, the tube elements) omitted. In FIGS. 3A-3D the fountain pen 100 is also removed from the holding element 22.

Figure 3A:
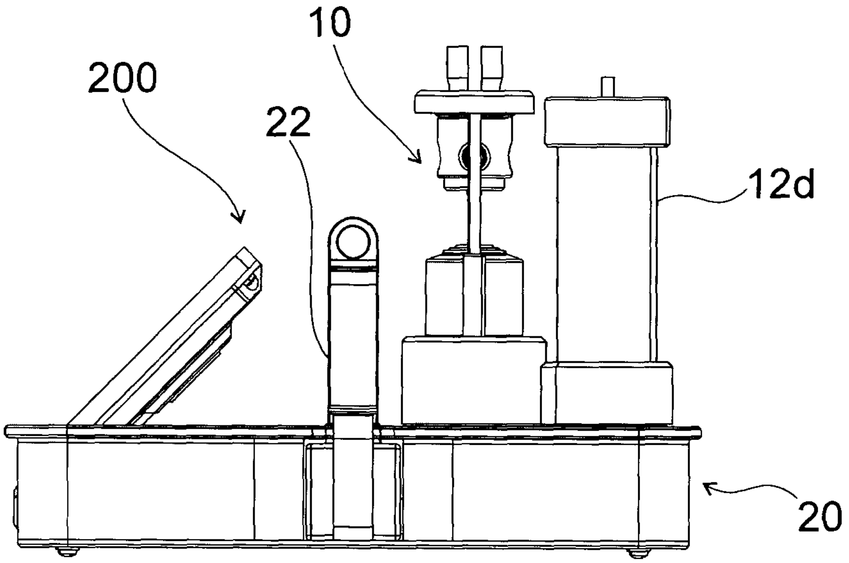
FIG. 3A is a side view of the embodiment of FIG. 1, with certain components removed.
Figure 3B:
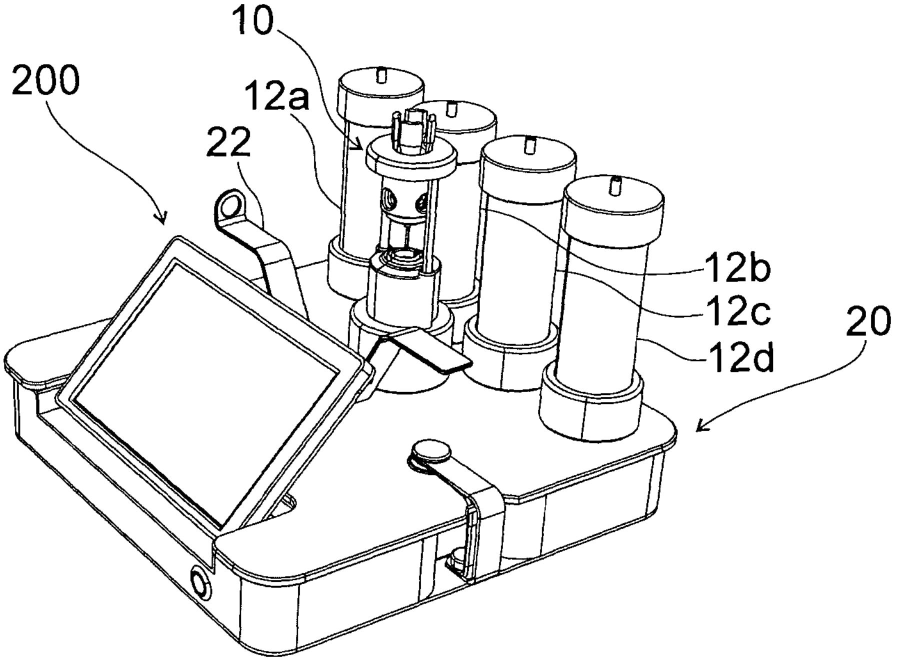
FIG. 3B is a view of the embodiment of FIG. 1, with certain components removed.

In FIG. 3A the mixing apparatus is shown in a side view. Accordingly, the extreme-position container 12*d* can be seen, and the filling unit 10 can also be observed in side view. The data entry unit 200, arranged in an inclined fashion, is also shown. In FIG. 3B a view very similar to the one shown in FIG. 1 is shown, with the tube elements being removed.

Figure 3C:
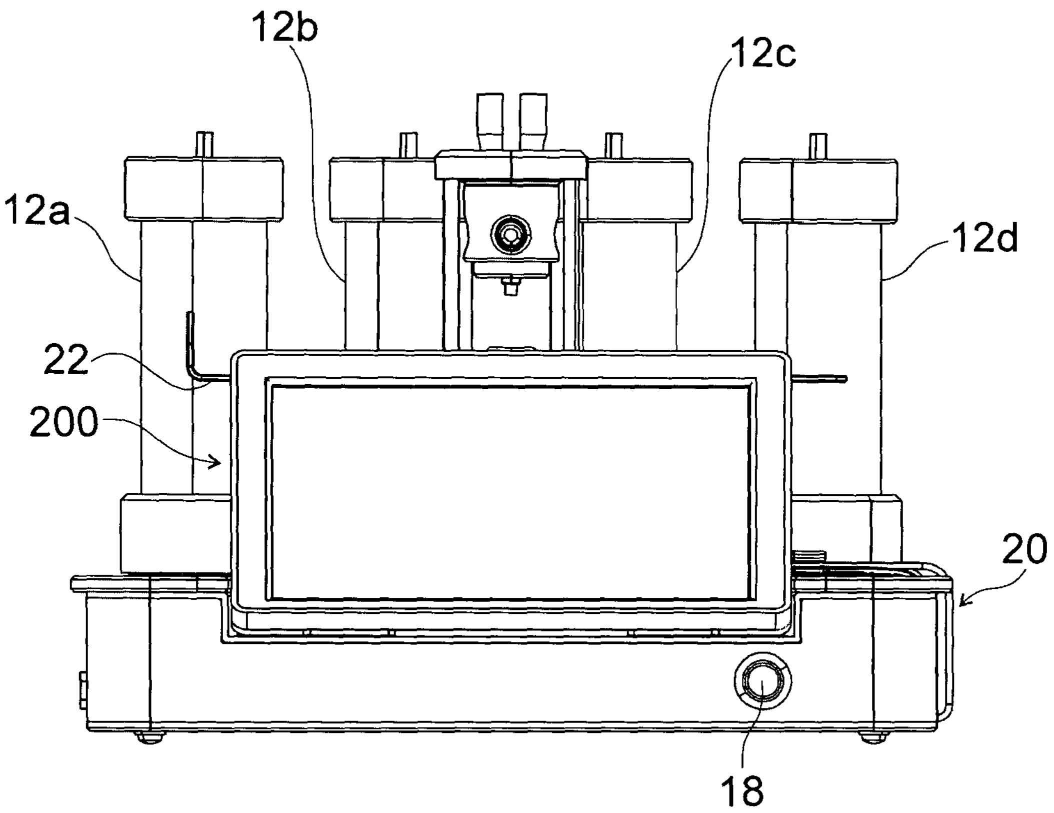
FIG. 3C is a front view of the embodiment of FIG. 1, with certain components removed.
Figure 3D:
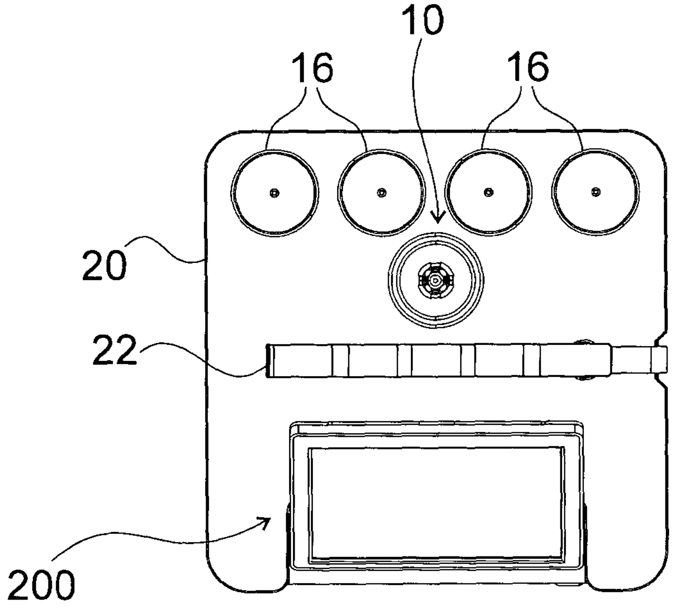
FIG. 3D is a top view of the embodiment of FIG. 1, with certain components removed.

In FIG. 3C the corresponding embodiment of the mixing apparatus is shown in front view, with the display 202 of the data entry unit 200 being shown in the foreground together with the start button 18. In FIG. 3D the embodiment according to FIG. 1 is shown in top view. Accordingly, the mutual arrangement of particular components, such as the containers 12*a*, 12*b*, 12*c*, 12*d* and the filling unit 10 can also be observed.

Figure 4:
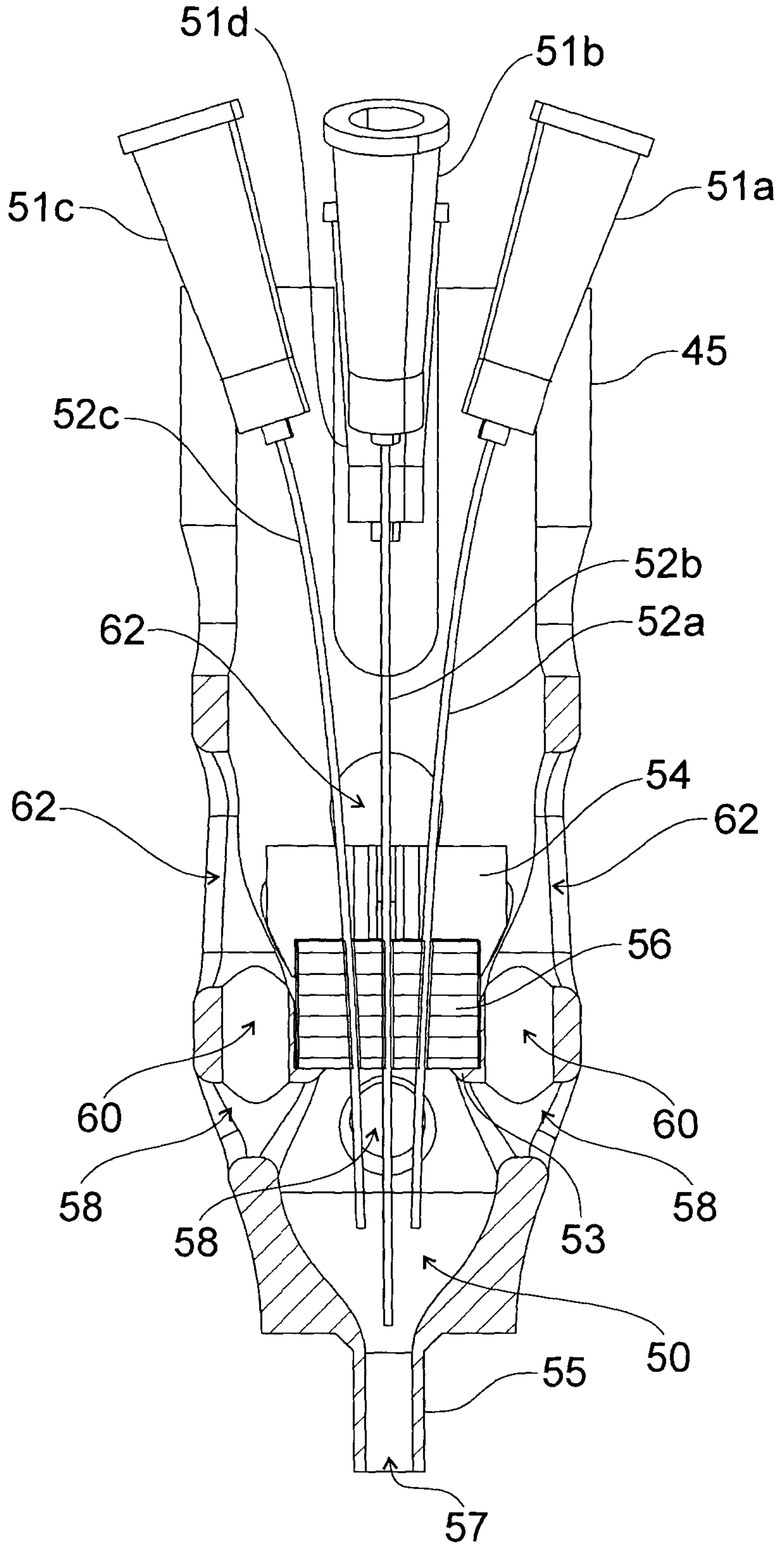
FIG. 4 is a sectional drawing of the mixing space part encasing element in the embodiment of FIG. 1.

In FIG. 4 the mixing space part encasing element 45 and the components arranged therein are shown in a sectional drawing. As illustrated also in FIG. 4, in this embodiment as the dispensing end portion of each tube element 13*a*, 13*b*, 13*c*, 13*d*, 13*e* a respective dispensing needle having an internal fluid channel is arranged. Alternatively, the dispensing needle can simply be termed a needle; in an exemplary implementation needles having a length of 42 mm are applied. The application of a dispensing needle allows for dispensing very low quantities at a time (the apparatus has good resolution), while foaming of the fluid (in this embodiment, ink) can also be effectively prevented. The basic colours of the ink mixture are conveyed into the mixing space part via the dispensing needles, from where the mixed ink is discharged to the container (cartridge) in the form of a droplet. Preferably, an element (dispensing element) is applied as a dispensing end portion, for example a dispensing needle or nozzle.

The mixing space part encasing element 45 is utilized also in the embodiment of FIG. 1, so in FIG. 4 a corresponding part of the embodiment of FIG. 1 is shown in more detail. In FIG. 4 dispensing needles 52*a*, 52*b*, 52*c* are shown; in this arrangement there are arranged two further dispensing needles behind the dispensing needle 52*b* that are obstructed from view (corresponding to the five containers there are arranged five dispensing end portions, i.e. five dispensing needles). Applying the dispensing needles, the fluid can be dispensed with high precision. In FIG. 4 there can also be seen dispensing needle connectors 51*a*, 51*b*, 51*c*, 51*d* adapted for connecting the dispensing needles to the corresponding tube elements.

Figure 5A:
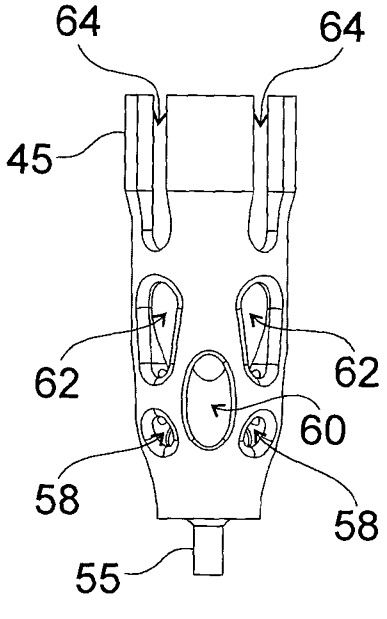
FIG. 5A is a side view of the mixing space part encasing element in the embodiment of FIG. 4.
Figure 5B:
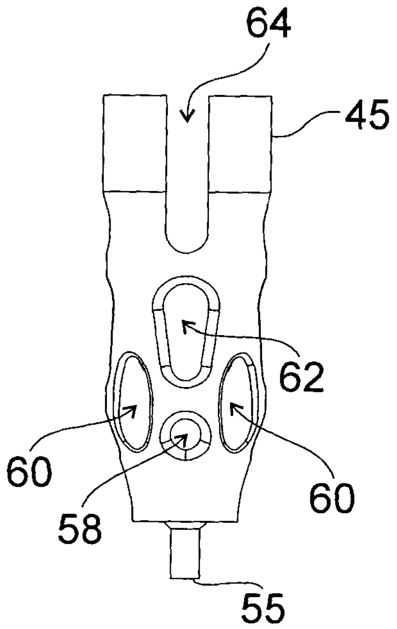
FIG. 5B is a side view of the mixing space part encasing element in the embodiment of FIG. 4.
Figure 5C:
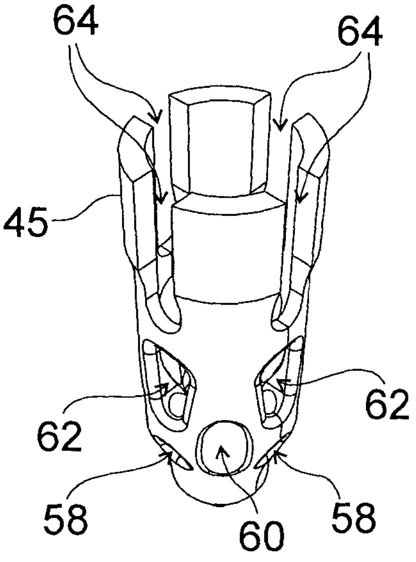
FIG. 5C is a view of the mixing space part encasing element in the embodiment of FIG. 4.

FIGS. 5A-5C illustrate notches 64 in which the dispensing needle connectors 51*a*, 51*b*, 51*c* are essentially seated, as well as a further dispensing needle connector that is obstructed from view by the dispensing needle connector 51*b*. In the illustrated arrangement the dispensing needle connector 51*d* is not seated in any of the notches 64, but is arranged in the middle among the other dispensing needle connectors, while it also extends slightly lower than the other dispensing needle connectors. Accordingly, the dispensing needle corresponding to the dispensing needle connector 51*d* is the one that extends deepest.

In FIG. 4 the mixing space part 50 (mixing region) can be seen at the bottom of the mixing space part encasing element 45. The mixing space part 50 is the space part into which the open end of the dispensing needles (dispensing end portions) extend, i.e. into which their fluid channels open. A first opening 57 that extends through the fluid discharge portion 55 (the fluid discharge portion 55 can also be called a fluid discharge tube) and through which the fluid can be discharged from the mixing space part 50 (as the mixing space part encasing element 45 has a nearly vertical, upright position—similar to the one illustrated in the figure—in case the mixing apparatus is installed appropriately, the mixed fluid simply flows out from the mixing space part 50) opens from the mixing space part 50. In this embodiment, therefore, the fluid discharge portion 55 (outlet, discharge stub) is the exit point of the mixed fluid (ink) in the direction of the container 25. In a manner illustrated in FIG. 11, through the orifice of the container the discharge stub is lowered into its neck portion, but it preferably does not extend as low as the height corresponding to the maximum level of the mixed quantity. During the removal of the container, a droplet potentially stuck to the outlet tube can be easily "skimmed" off the surface utilizing the orifice of the container and directed therein (applying a shaker engine it is even possible to prevent the formation of residual droplets, see below).

As shown in FIG. 4 (and in subsequent figures), air flow openings 58, 60, 62 (air vent openings) are preferably arranged on the side wall of the mixing space part encasing element; in this embodiment the mixing space part 50 can also be defined such that the spatial region extending from the air flow openings 58, 60, 62 (particularly from the air flow opening 58 laying closest) towards the fluid discharge portion 55 corresponds to it. As illustrated in FIG. 4, fluid is conveyed into this spatial region by the dispensing needles, i.e. if the mixing space part encasing element 45 is arranged essentially (with a few degrees approximation) vertically, the fluid arriving into the mixing space part 50 cannot escape through the air flow openings 58, 60, 62.

In the embodiment shown in FIG. 4, a spongy material insert element 56 (or, in a shorter term, sponge insert) is arranged in the mixing space part encasing element 45, and the dispensing needles (such as the dispensing needles 52*a*, 52*b*, 52*c* shown in FIG. 4) passed through the spongy material insert element 56 (member) extend into the mixing space part 50.

Furthermore, in the embodiment according to FIG. 4 the spongy material insert element 56 is arranged in a receiving portion fitting to the shape of the spongy material insert element 56 (bounded from the side by the corresponding internal features of the mixing space part encasing element 45, and supported from at bottom—i.e. from the direction of the mixing space part 50—by a rim 53), and a needle guide element 54 (member) adapted for guiding the dispensing needles is arranged fitted against the side of the spongy material insert element 56 being opposite the mixing space part 50.

Figure 7A:
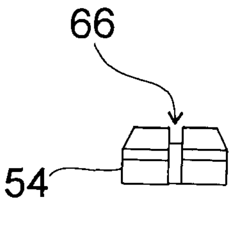
Figure 7B:
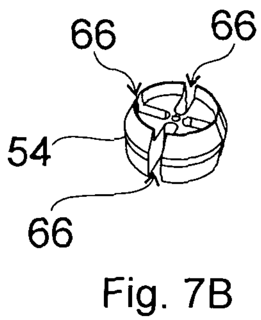
Figure 7C:
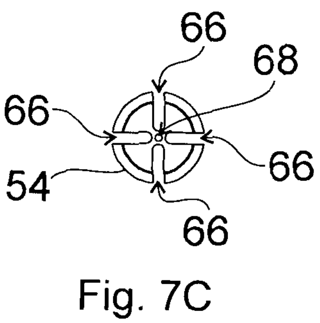

The needle guide element 54 is illustrated in FIGS. 7A-7C (arranged rotated upside down relative to the position it is shown in FIG. 4). As shown in FIGS. 7A-7C, the needle guide element 54 has notches 66 that are formed in its side and are adapted to extend between the ends, and a respective dispensing needle is passed through each of the notches 66. A further dispensing needle is passed through the passage 68 formed in the centre of the needle guide element 54. An indentation formed in the needle guide element 54 can be seen particularly clearly in FIG. 7B (in the side facing the insert element 56) in which the preferably cylindrically shaped insert element 56 is seated.

The spongy material insert element 56 is an insert preferably made of a technological sponge material, with one of its sides being adhesively retained in a recess formed on the side of the needle guide element 54 (roller ring element, needle roller ring guide) facing the insert element 56, and its other side being fitted in a specially configured seat of the mixing space part encasing element 45 (mixing space part module).

The needle guide element 54 is therefore adapted for guiding the dispensing needles. It is fixed (to the inside of the mixing space part encasing element 45) in the position shown in FIG. 4 preferably applying thermoplastic adhesive. This adhesive bonding can be easily undone, and the entire needle group can be removed at the same time.

Furthermore, in the embodiment of FIG. 4 in a vertical position of the mixing space part encasing element 45 the mixing space part 50 is formed at the bottom-laying (bottom) part of the inner space of the mixing space part encasing element 45, and air flow openings 58, 60, 62 adapted to interconnect a portion of the inner space of the mixing space part encasing element 45 being is contiguous with the mixing space part 50 and a spatial region surrounding the mixing space part encasing element 45 are formed on the wall of the mixing space part encasing element 45, on the portion above the mixing space part 50. At least one such air flow opening is formed, but to allow for through-ventilation the air flow openings are expediently arranged in pairs.

In FIG. 4 more than one types of air flow opening are shown, arranged in a pair-by-pair manner such that they provide through-ventilation of the inner space above the mixing space part 50. The air flow openings 58 shown in FIG. 4 have a major role. Comparing FIG. 4 with FIGS. 5A-5C it can be seen that in this embodiment four air flow openings 58 are arranged in pairs (the members of which facing each other) along the circumference, with an angular separation of 90°. The unique role of the air flow openings 58 can be comprehended contemplating for example FIG. 11: through-openings 72, 78 on the part of the neck portion 40 (arranged in the assembled state around the mixing space part encasing element 45) that is situated around the mixing space part encasing element 45, as well as of the air pass control element 70 (air vent control element, element for controlling passing of air) are centred on the air flow openings 58, providing that preferably the greatest share of ventilation occurs through them. Comparing FIGS. 4, 5A-5C and 11 it can be seen that air can also flow through further air flow openings 60, 62, i.e. it is conveyed also to them from the outside space in the air gap between the mixing space part encasing element 45 and the cylindrical portion 75 of the neck portion 40.

The air flow openings 60 are arranged such that in respect of their longitudinal extension they are aligned also with the air flow openings 58 and 62. As illustrated in FIG. 11, the mixing space part encasing element 45 is fixed in the cylindrical portion 75 of the neck portion 40 encompassing the mixing space part encasing element 45 also at the level at which the air flow openings 60 are situated (i.e. it contacts the side wall thereof at this region); accordingly, it is the portion between the air flow openings 60 that is pressed against the wall of the cylindrical portion 75 of the neck portion 40 (see also FIGS. 6B and 6C where the respective sections intersecting the air flow openings 58 and the air flow openings 60 can be compared). In FIG. 4 showing a sectional view taken through the air flow openings 58 and 62 there is shown that the air flow openings 58 are essentially in connection with the air flow openings 62, and also with the air flow openings 60 (arranged angularly spaced apart relative to them along the circumference) in the inner space of the mixing space part encasing element 45. In essence, an interconnection channel between the air flow openings 58 and 62 (situated above each other) is formed inside the mixing space part encasing element 45, the interconnection channel also establishing a connection with the air flow openings 60.

The air flow openings 62 are formed in an indented manner, such that air is delivered through them between the mixing space part encasing element 45 and the cylindrical portion 75. The air flow openings 60 are formed essentially at the same height as the spongy material insert element 56, the air flow openings 62 being formed essentially at the same height as the needle guide element 54. The at least one air flow opening making the mixing space part encasing element opened can also be arranged without the inclusion of the spongy material insert element 56 and the needle guide element 54. In the embodiment shown in FIG. 4, however, these components are also taken into account for designing the arrangement of the air flow openings, which are also positioned by appropriate encompassing portions in the inner space of the mixing space part encasing element 45.

Thanks to the air flow openings, the mixing space part encasing element 45 shown in FIG. 4 is an open-type mixing space part module. The mixing apparatus according to the invention can also be implemented applying a closed mixing space part. In the latter case the dispensing end portions (e.g. dispensing needles) are terminated in a closed spatial region that only has an outlet opening, i.e. no air flow opening is arranged. In the case of both an open-type and a closed-type mixing space part encasing element, the mixing space part is defined by a dedicated element, the mixing space part being formed in the inner space thereof. In contrast to that, in the known approaches no mixing space part encasing element is applied; mixing being typically carried out in a mixing bowl, with the different coloured fluids being poured therein from above.

The open-type mixing space part configuration (applying air flow openings) can be operated with a much lower failure rate compared to the closed-type one. The lower failure rate is due to the configuration of the system of air passages (permeating the entire module, i.e. the mixing space part encasing element) and to the appropriately positioned needles. Thanks to these, compared to the known approaches, a much lower amount of fluid is required for flushing the mixing space part, while ink cross-leaking can be preferably avoided.

Flushing of the mixing space part is helped to a great extent if there a tube (e.g. a silicone tube with an inside diameter of 3-4 mm) adapted for inletting a flushing fluid (for example, distilled water) can be inserted through the air flow openings, and the mixing space part and the needle ends can be flushed by a flushing fluid.

The end of the flushing tube can be expediently introduced into the air flow openings 58 (the flushing tube is pushed into them), in which case it is not necessary to remove the air pass control element 70 (outside cylinder) before cleaning, and it is also not necessary to remove the mixing space part encasing element 45 from the cylindrical portion 75 of the neck portion 40.

Our experiments have indicated that if the end apertures of the internal fluid channels of the dispensing needles opening into the mixing space part are too close to each other, then, due to the capillary effect adjacent needles may take up fluid from each other, thus causing mixing of the different fluids (different colours), resulting in a disruption of the dispensing operation (as a part of the quantity dispensed by a needle is taken up by other dispensing needles). This capillary effect can be avoided by arranging the end apertures of the fluid channels spaced apart from one another by an appropriate distance.

Accordingly, in an embodiment the end apertures of the internal fluid channels of the dispensing needles 52*a*, 52*b*, 52*c* are situated at a distance of at least 1.25 mm, preferably at least 1.75 mm from one another. According to our experiments, with a distance of 1.25 mm the capillary effect can be reduced such that it is no longer disruptive. Above a distance of 1.75 mm the capillary effect is reduced to such a degree that very high dispensing precision can be achieved. Of course, as the mixing space part has a finite volume, the dispensing needles and their end apertures are not spaced too far apart, their mutual distance being typically a bit above this value, but not by much (for example, the maximum distance between the end apertures is 10 mm, preferably 7 mm). A further consideration is that it is expedient to keep apart the end apertures of the dispensing needles from the wall of the mixing space part (i.e. from the inside wall of the mixing space part encasing element) to such an extent that a droplet formed at the end of the dispensing needle do not contact the wall. According to our measurements, this can be ensured if the end aperture of the dispensing needle situated at a distance of at least 2-3 mm from the wall along the direction of the dispensing needle. The above hold true for needles cut at an angle as well as for perpendicular-cut needles, for measuring the distance between them, the centres of the end apertures are taken into account.

The maximum width of the mixing space part 50 is for example 5-15 mm, preferably 10-13 mm, more preferably 11-12 mm, in an example approx. 11.5 mm. The maximum height of the mixing space part 50 (measured from the bottom of the air flow opening 58 to the horizontal line found at the top portion of the fluid discharge portion 55) is for example 5-15 mm, preferably 8-11 mm, more preferably 9-10 mm, in an example approx. 9.5 mm. FIG. 4 (and all the other figures) are, to a good approximation, drawn to scale.

In the embodiment shown in FIG. 4 the dispensing needles are arranged such that four end apertures (preferably the end apertures of the dispensing needles corresponding to the tube elements exiting the containers of coloured inks) are essentially situated at an identical height (preferably symmetrically about the principal axis of the arrangement). The end aperture of the fifth dispensing needle 52*b* is situated somewhat lower (preferably, at least 3 mm lower, in an example, approx. 5.3 mm lower) than that. With this configuration the above defined distances between the end apertures can be provided in a preferable fashion. This is because by arranging the four dispensing needles symmetrically around the fifth one (the dispensing needles preferably extend parallel, forming a needle bundle), with the end aperture of the latter being situated lower (i.e. at a greater distance); the mutual distance between the four symmetrically arranged end apertures is already greater (due to their encompassing of the fifth dispensing needle), while their greater distance from the fifth end aperture is provided because it is situated lower.

Another consideration for the arrangement of the ends of the needles is that during operation the colourless ink has the most "intense" flow (the operational flow velocity of the pump adapted for dispensing the colourless fluid is preferably twice the flow velocity of the other pumps, the flow rate of the conveyed ink being a multiple of the flow rates thereof), which, due to the viscosity parameters could possibly result in clogging and cross-leaking. Therefore, the end aperture of the dispensing needle of the colourless fluid is preferably located the lowest, expediently opposite the opening 57 of the fluid discharge portion 55. Thereby, the phenomenon of "pulling out" additional quantities of ink from the other dispensing needles by the "intensely" flowing colourless ink after the pumps adapted for conveying coloured fluids have already stopped can be prevented.

The above described arrangement is advantageous also because the widest part of the applied needles (which in this case corresponds to the dispensing needle connectors 51*a*, 51*b*, 51*c*) has a far greater diameter than the outlet point of the needles, so in case the five needles were arranged at the same level, the greatest diameter of the needle group would be increased significantly, and would even result in excess bending of the needles.

In the illustrated embodiment (see FIG. 4) the containers comprise a container 90 adapted for storing colourless fluid, and containers 12*a*-12*d* adapted for storing coloured fluids, and the end aperture of the dispensing needle 52*b* corresponding to the container 90 adapted for storing the colourless fluid (in the illustrated case the entire dispensing needle 52*b* is arranged lower) is situated closer to the fluid discharge portion (55) than the end apertures of the dispensing needles (the dispensing needles 52*a*, 52*c*, and other dispensing needles obstructed from view). corresponding to the containers 12*a*-12*d* adapted for storing the coloured fluids. To achieve the above effect (i.e. in order to prevent the other fluids from being "pulled out") it is sufficient to arrange the dispensing needle of the colourless fluid a little bit closer to the fluid discharge portion 55 than the other needles, but in the example there is a fair amount of space, so in order to make it easier to arrange the dispensing needle connectors 51*a*, 51*b*, 51*c* it is arranged 3 mm closer. The distance difference therefore can also be adjusted to match the configuration of the dispensing needle connections.

The needle guide element 54 and the insert element 56 are preferably inserted into the mixing space part encasing element 45 after being fixed (adhesively bonded) together, with the dispensing needles (i.e. also the dispensing needles

52*a*, 52*b*, 52*c* shown in FIG. 4) having been already passed through them. When the spongy material insert element 56 is adhesively bonded to the needle guide element 54 it typically does not yet have passages; the dispensing needles are passed through the spongy material insert element 56 subsequently (but only after passing them through the needle guide element 54, i.e. through the notches 66 and passage 68 thereof). The thin and sharp needle is therefore penetrated through the sponge material that preferably does not obstruct the internal fluid channel of the dispensing needle because the particles of the sponge material are preferably too large for that (at least that is true for generally available technological sponge materials).

The spongy material insert element 56 has a major role in fixedly retaining the dispensing needles in the assembly to be inserted (needle guide element 54, insert element 56, dispensing needles). The dispensing needles are retained in the position they assumed when penetrating the spongy material insert element, keeping their end apertures at a fixed position, and are also assisted in holding their positions relative to the needle guide element 54. In such a way the assembly can be grabbed easily for insertion (it can be easily inserted). During insertion the dispensing needles are also protected by the spongy material insert element 56 because it also provides a flexible connection (guiding).

The mixing space part 50 is the location where the fluids to be mixed (e.g. inks) are brought together. The dispensing needles emit a relatively straight fluid jet even at low dispensing velocities, i.e. the fluid flows are directed from the dispensing needles toward the bottom portion of the mixing space part. It is expedient to provide the inside portions of the mixing space part encasing element 45 confining the mixing space part 50 with an appropriate surface. The bottom part of the mixing space part encasing element 45 (preferably the part under the air flow openings that is separated from the other parts—situated higher—of the mixing space part encasing element 45 where the horizontal line runs under the air flow opening 58 in FIG. 4) is made as a separate component, and is affixed to the remaining portion of the mixing space part encasing element 45 later (for example by adhesive bonding or by an appropriately configured thread). The inside surface of such a separate piece (i.e. the portion of the mixing space part encasing element 45 confining the mixing space part) can be high-polished, or its smoothness can be improved in other ways, for example applying a teflon coating. These measures aimed at increasing smoothness can be applied for a separate piece but they can also be taken when the mixing space part encasing element is made integrally.

Applying the narrowing configuration shown in the figure, as well as other configurations, and by the appropriate control of the fluid transfer means (pumps) it can be achieved that it is not filled up completely even if all fluid transfer means are operated at the same time (i.e. if all colours are dispensed at the same time, since the application of all fluids is necessary), while the fluid can also be prevented from splashing back. Applying the illustrated configuration, no contaminant (fluid) related to operation escapes through the air flow openings. The different fluids, e.g. different colours, are mixed in the mixing space part.

Notches 64 adapted for facilitating the arrangement of the dispensing needle connectors 51*a*, 51*b*, 51*c* (by inclining/extending into them) can be observed also in FIG. 4 (but they are also marked in FIGS. 5A-5C). The notches 64 can therefore be seen in FIGS. 5A-5C, of which FIGS. 5A and 5B show respective side views of the mixing space part encasing element 45 rotated by 45° relative to each other about the vertical axis shown in the figure. As shown in FIGS. 5A-5B the air flow openings 58 and the air flow openings 60, respectively have essentially circular and ellipsoidal cross section. The air vents 62 have an elongated shape that has a smaller radius at one end than at the other end.

Figure 6A:
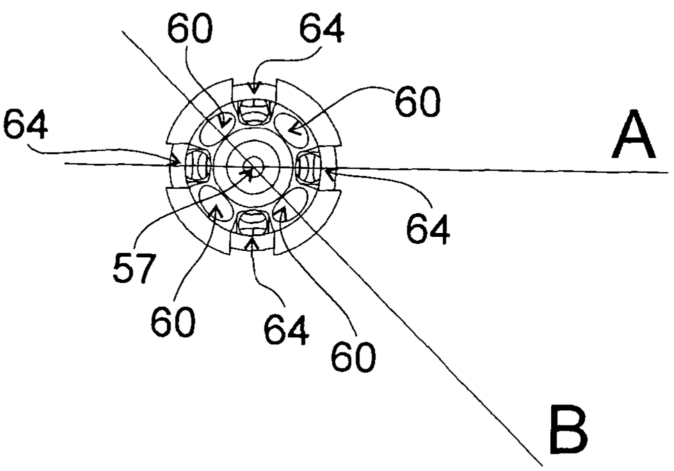
FIG. 6A is a top view of the mixing space part encasing element in the embodiment of FIG. 4.

In FIG. 6A the mixing space part encasing element 45 is shown in top view. In FIG. 6A the mixing space part encasing element 45 is shown empty, i.e. with the spongy material insert element 56 and the needle guide element 54 removed. Thanks to this, an opening 57 leading out of the mixing space part 50 comes into view in the centre of the top view. In FIG. 6A there can also be observed the inner space of the mixing space part encasing element 45; the configuration of the inner space can be more easily grasped by contemplating the sectional views shown in FIGS. 6B and 6C, taken along the line (plane) A and B, respectively, of FIG. 6A.

In the top view of FIG. 6A the outline of the air flow openings can be observed to some extent. As illustrated also in FIGS. 5A-5C, the inside ends of the air flow openings 58 and 62 can be observed under notches 64, while the inside ends of the air flow openings 60 can be observed between the notches 64.

Figure 6B:
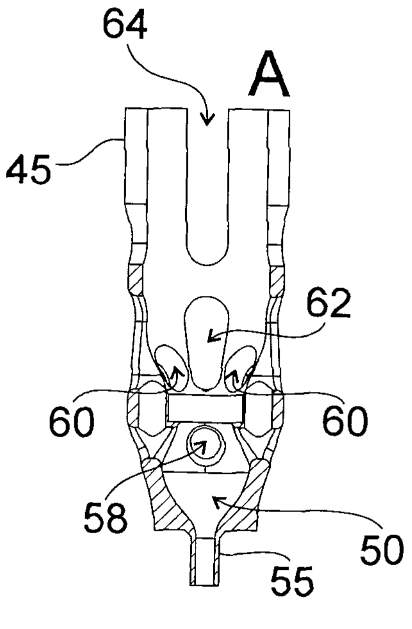
FIG. 6B is a sectional view of the mixing space part encasing element in the embodiment of FIG. 4.

As shown in FIG. 6A, section A intersects two opposite-laying notches 64 and therefore, also the air flow openings 58 and 62. Section A according to FIG. 6B is also shown in FIG. 4, however, in FIG. 6B—as with FIG. 6A—the spongy material insert element 56 and the needle guide element 54 are removed. Accordingly, in FIG. 6B parts situated behind them come into view. In FIG. 6B, further configuration details of the openings 60 and of the channel that leads from them into the inner space of the mixing space part encasing element 45 can be observed. The air flow opening 60 can be seen through the air flow openings 58 and 62, while in FIG. 6B the portions of the air flow openings 60 that lead into the inner space (situated at both sides of the air flow opening 62) come into view. It can also be discerned from FIG. 6B that the inner space of the mixing space part encasing element 45 has a calyx-shaped configuration (narrowing downwards in the figure) above the portion intended for the spongy material insert element 56 (having a circular outline in the view shown in the figure): the needle guide element 54 is inserted here. As shown in the figure, the mixing space part 50 has a configuration that first widens and then narrows from the top towards the bottom portion (i.e. towards the opening 57).

Figure 6C:
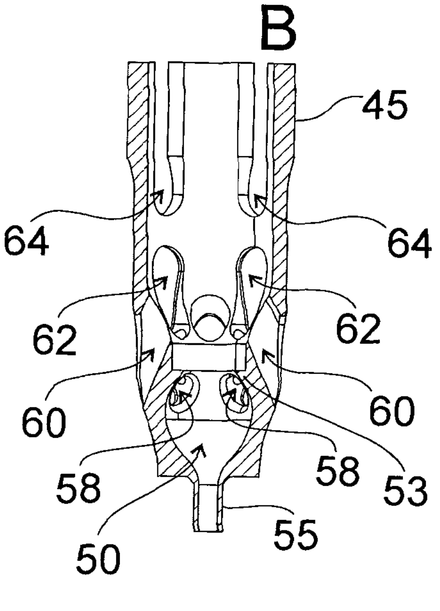
FIG. 6C is a further sectional view of the mixing space part encasing element in the embodiment of FIG. 4, FIGS. 7A-7C show the needle guide element applied in the embodiment of FIG. 4.

Further details of the configuration of the inner space of the mixing space part encasing element 45 can be observed in FIG. 6C showing section B. In accordance with section B, two notches 64 are visible. The introductory portions of the air flow openings 62 and 58 can be seen under the notches 64, with the introductory portion of the air flow opening 60 situated oppositely being seen between them. Section B intersects two air flow openings 60 laying opposite each other. In FIG. 6C it can be observed that the air flow openings 60 extend upwards from the outside of the mixing space part encasing element 45, terminating in the portion with a calyx-shaped configuration. In FIG. 6C the inside wall portions that are terminated in the rim 53 adapted for supporting the spongy material insert element 56 from below are shown. Above it, that spatial region is shown into which the insert element 56 can be inserted, with the needle guide element 54 being arranged above it. In this cross-sectional view, the shape of the mixing space part 50 is defined by these wall portions. It is also illustrated in FIGS. 6B and 6C that the air flow opening 60 communicates with the channel interconnecting the air flow openings 58 and 62.

In sum, the major features of the inner space of the mixing space part encasing element 45 are the following (from top to bottom as shown in the figures):

inner space having a top-to-bottom narrowing configuration, where the spongy material insert element 56 can be placed (inserted) in the bottom portion of the inner space, and the needle guide element 54 can be placed thereon (these two components essentially divide into two parts the inner space of the mixing space part encasing element 45 along its longitudinal axis), mixing space part 50 arranged at the bottom, with air flow openings being formed above its top portion, and with further air flow openings being arranged to open into an upper spatial region "separated" by the spongy material insert element 56 and the needle guide element 54, interconnecting channels arranged between the two internal spatial regions separated by the spongy material insert element 56 and the needle guide element 54.

Figure 8:
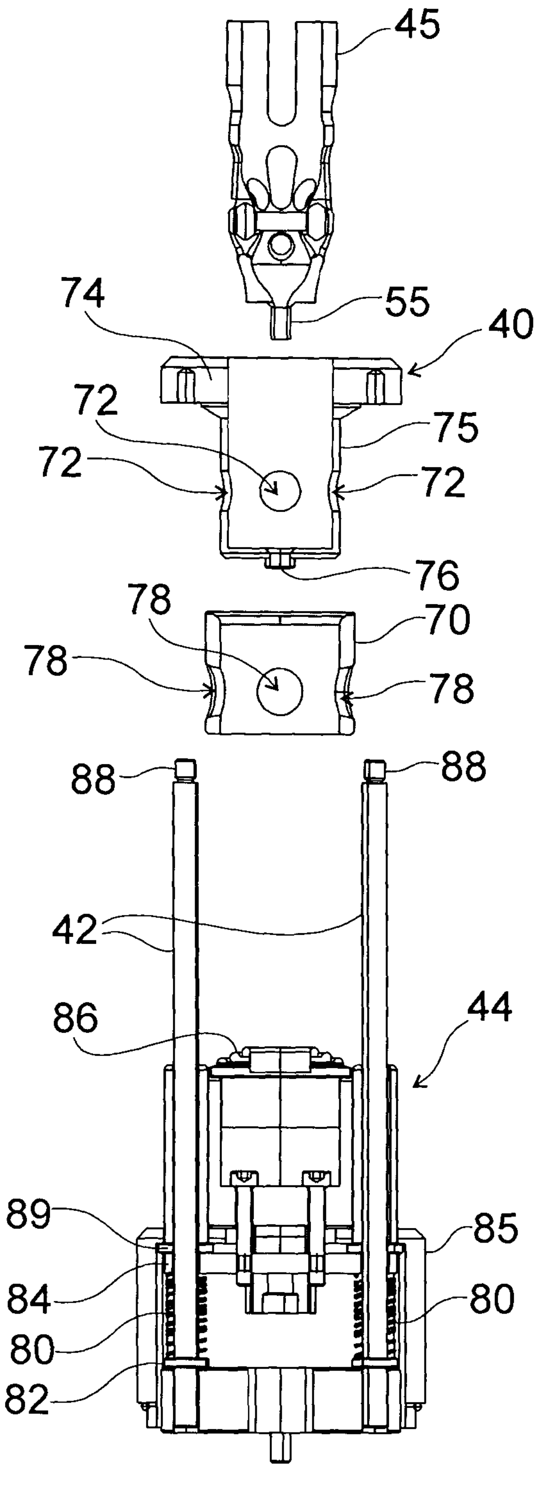
FIG. 8 is an assembly drawing showing a sectional view of the filling unit applied in the embodiment of the mixing apparatus shown in FIG. 1.
Figure 9:
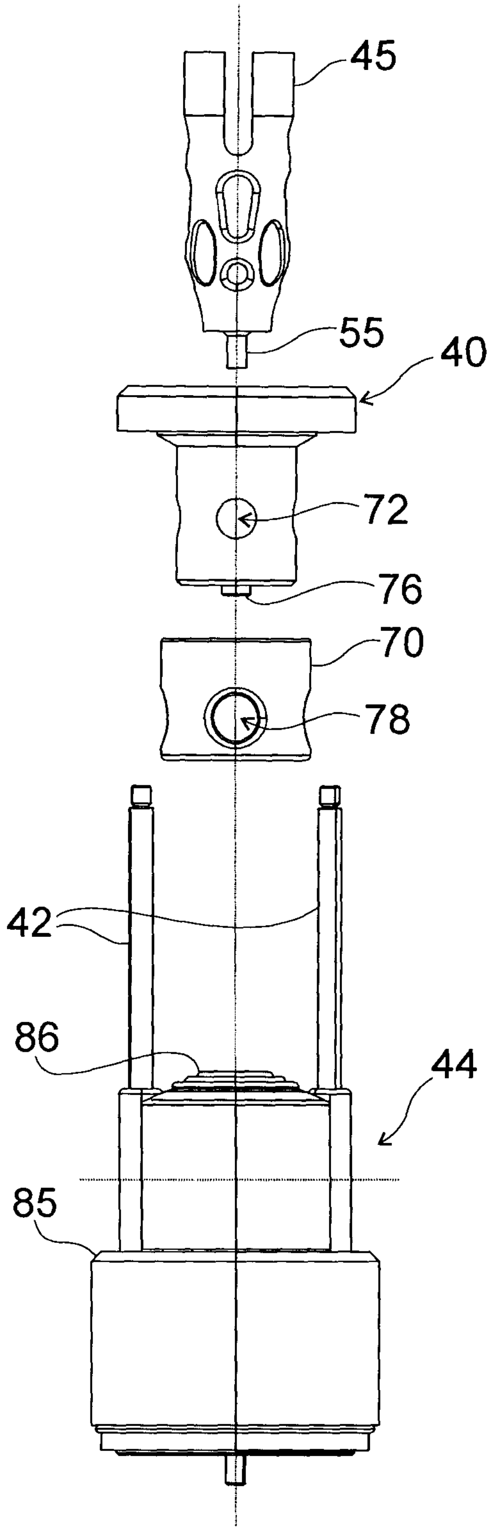
FIG. 9 is a view of the filling unit of FIG. 8, FIGS. 10A and 10B are side view drawings showing different views of the filling unit of FIG. 8 in the assembled state.

In FIGS. 8 and 9 the assembly of the filling unit 10 are shown in section and elevation views (with special regard to the neck portion and to the components connected thereto; the assembly of the base portion is shown in FIG. 13-16). FIGS. 8 and 9 show the threaded ends 88 of the rod elements 42 (the corresponding counterthreading is shown on the neck portion 40). During assembly, the threaded bores of the neck portion 40 are placed on the threaded ends 88 of the rod elements 42, and each threaded ends 88 are screwed into the threaded corresponding bore by rotating the rod elements 42.

The neck portion 40 (having a T-shape in the section shown in FIG. 8) is therefore fitted against the end of the rod elements 42. Four through-openings 72 are formed, at equal angular separation (with an angular separation 90°), on the side wall of a cylindrical portion 75 of the neck portion 40 extending in the assembled state between the rod elements 42. The mixing space part encasing element 45 shown above the neck portion 40 fits inside the inner space of the cylindrical portion 75, with the fluid discharge portion 55 thereof being fitted inside a second opening 76 formed on the end portion of the cylindrical portion 75 facing the base portion 44. In this embodiment, therefore, the fluid discharge portion 55 of the mixing space part encasing element 45 extends over the closed end of the cylindrical portion 75 of the neck portion 40 (the mixing space part encasing element 45 is inserted through the open end of the cylindrical portion 75).

According to the assembly schematics, the air pass control element 70 adapted to be arranged around the cylindrical portion 75 is shown below the neck portion 40. For fitting together the components, the neck portion 40 has a conical portion at the intersection of its horizontal portion and cylindrical portion 75, against which conical portion the also conical inlet portion of the air pass control element 70 is fitted. On the side wall of the air pass control element 70 there are formed first through-openings 78 (in this embodiment, four such openings are included, also at an angular separation of 90°), the openings being aligned with the through-openings 72 when the components are fitted together as shown in the figure.

In this embodiment, therefore, the mixing apparatus comprises an air pass control element 70 being rotatably arranged around the mixing space part encasing element 45 and having at least one first through-opening 78. When the air pass control element is rotated into its open position, at least one of its at least one through-openings is aligned with at least one of the at least one air flow openings of the mixing space part encasing element, and, when the air pass control element is rotated into its closed position, each one of the at least one air flow openings of the mixing space part encasing element is covered by the air pass control element.

In the embodiment that can be seen also in FIG. 8 this is provided as follows:

the air pass control element 70 is aligned with the air flow opening (in this case the air flow opening 58) such that the wall if the cylindrical portion 75 of the neck portion 40 is inserted between them, i.e. the air flow openings are aligned with the hole in the wall;

each through-opening of the air pass control element 70 is aligned with a corresponding air flow opening, in the illustrated case, with are the air flow openings 58;

thanks to the inclusion of the cylindrical portion 75 (although this could be provided by the air pass control element 70 itself) in this embodiment all of the air flow openings of the mixing space part encasing element 45 are covered (obstructed) in the closed state of the air pass control element 70, i.e. not only those with which the through-openings of the air pass control element 70 become aligned in the open state (i.e. the air flow openings can be closed fully); and the open state of the air pass control element 70 is brought about when the first through-openings 78 are aligned—via second through-openings 72—with the air flow openings 58, while the closed state is brought about when the air pass control element 70 is rotated by 45° with respect to the open state, i.e. the air flow openings 58 are covered by the continuous wall portions of the air pass control element 70 (it has to be ensured that the continuous wall portion are large enough for providing complete covering).

In FIG. 9 this is also shown in a view, i.e. the outward shape of the mixing space part encasing element 45, the neck portion 40, and the air pass control element 70 can be observed. The internal configuration of the base portion 44 is shown in FIG. 8, however, it will be described in detail in relation to FIG. 11 below.

Figure 10A:
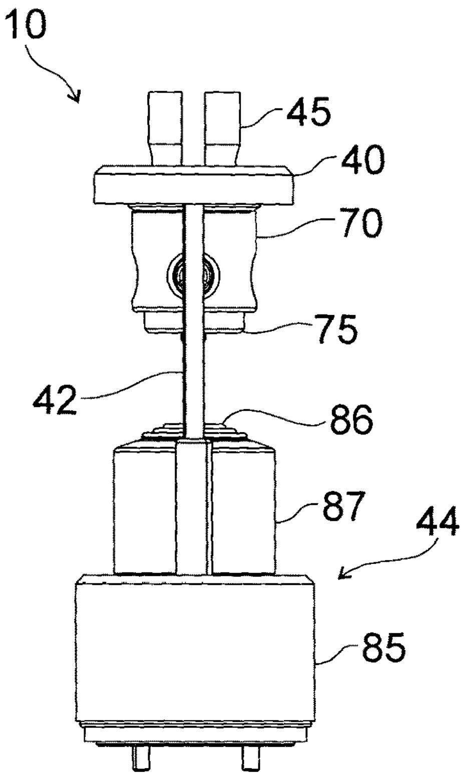
FIG. 10C is a view illustrating the assembled state of FIG. 10A.
FIG. 10D is a top view drawing illustrating the assembled state of FIG. 10A.

In FIGS. 10A-10D, views of the filling unit 10 are shown in the assembled state. In FIG. 10A the filling unit 10 is shown from the direction of the rod elements 42, in side view. The upper portion of the mixing space part encasing element 45 protrudes from the neck portion 40, and the interconnection between the neck portion 40 and the rod elements 42 can also be observed. A support element 86 (member) adapted for supporting the container 25, and a corresponding support element housing 87 (both being subcomponents of the base portion 44) are also shown. These components are arranged on a base portion housing 85.

Figure 10B:
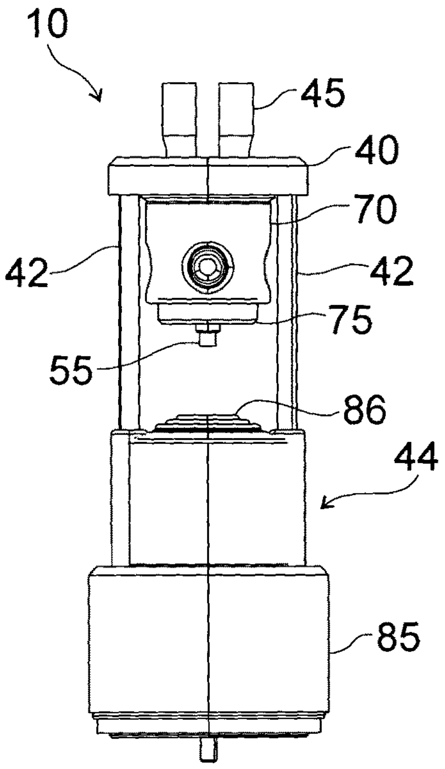
Figure 10C:
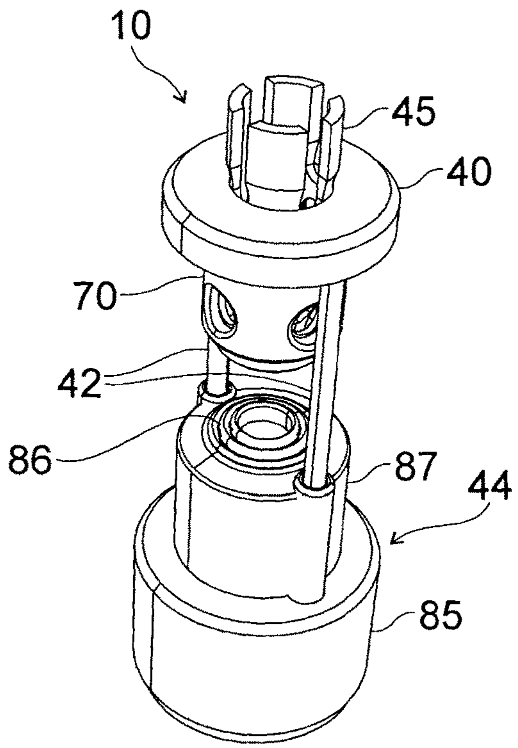
Figure 10D:
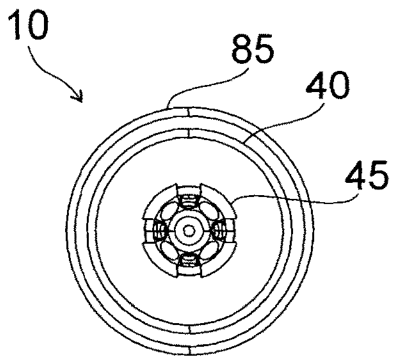

In FIG. 10B the filling unit 10 is shown also in side view; however, in this view the space between the two rod elements 42 can be seen. It is observable that the air pass control element 70 encompassing the cylindrical portion 75 of the neck portion 40 extends between the two rod elements 42. In FIG. 10C this arrangement is shown in a view, slightly from above. The shape of the support element 86 adapted for supporting (receiving) the container 25 is easily observable in FIG. 10C. FIG. 10D shows from above the filling unit 10, i.e., corresponding to the top plan view, the mixing space part encasing element 45, the neck portion 40, and the base portion housing 85.

In FIG. 11 the filling unit 10 is shown in sectional view such that the container 25 is inserted between the neck portion 40 and the base portion 44. As in FIG. 4, in FIG. 11 the dispensing needles 52*a*, 52*b*, 52*c* and other features related to the mixing space part encasing element 45 are shown. It can be observed in FIG. 11 that in this arrangement the fluid discharge portion 55 of the mixing space part encasing element 45 is preferably fitted in the container 25 (the stub of the opening 76 of the neck portion 40 is situated between the fluid discharge portion 55 and the neck of the container 25). Preferably, the fluid discharge portion 55 and the orifice of the container 25 into which the fluid discharge portion 55 (or the stub of the opening 76 of the neck portion 40, if protrudes therebetween) extends can be configured to have mutually closely fitting shapes. The portion of the fountain pen 100 into which the container 25 can be inserted as an ink cartridge is preferably also configured to have a (closely) fitting shape. Preferably, this configuration allowing close fitting also prevents other commonly used or commercially available ink cartridges from being inserted. Due to this configuration, the mixing apparatus, the container 25 and the fountain pen 100 preferably constitutes a system that has mutually compatible components, but the use of the components in other systems is either not preferable or even not possible.

As it was mentioned above, in the assembled state shown in FIG. 11 the fluid discharge portion 55 can be fitted into the opening 76 of the cylindrical portion 75 (cf. FIG. 8). As shown in FIG. 11, a conical portion of the end of the mixing space part encasing element 45 can be fitted in an also conical portion formed about the opening 76 of the cylindrical portion 75. This fitting assists in positioning the mixing space part encasing element 45.

It is also shown in FIG. 11—in line with FIG. 8—that the opening 76 is formed in a slightly protruding stub. The fluid discharge portion 55 has a width corresponding to the width of the opening 76, so it fits appropriately inside the opening 76. According to FIG. 11 it is furthermore expedient to apply such a container 25 that has a neck portion with an inside width that matches the outside dimensions of the stub of the opening 76 (see FIG. 11). In such a case the container 25 can also be fitted to the stub of the opening 76 such that it cannot be displaced laterally. As it will be demonstrated below in relation to the shaker engine responsible for shaking, this is significant also for performing the shaking action.

As shown in FIG. 11, the neck portion 40 is affixed to the threaded end 88 of the rod elements 42. Besides that, FIG. 11 also shows how the rod elements 42 are arranged in the base portion 44 according to the present embodiment (this arrangement will be described in detail below).

As shown in FIG. 11, the bottom end portion of the container 25 can be fitted inside an indentation formed in the middle of the support element 86. Accordingly, the container 25 is prevented from moving sideways by the support element 86, which provides further protection against displacement. The support element 86 is preferably made of a resilient material (e.g., rubber). The configuration with rings as can be observed for example in FIG. 10C has aesthetic reasons.

If a container with special dimensions and configuration features (i.e. a non-standard one) has to be applied to achieve proper fitting to the filling unit, then a fountain pen adapted to be utilized with the container can also be configured such that it can receive this particular container. The container 25 is of course not significantly different in dimensions from standard fountain pen cartridges, with the filling unit 10 being dimensioned accordingly. In an example the filling capacity of the container 25 is to a good approximation 2 ml.

In the following the meaning of the phrase "the neck portion 40 and the base portion 44 are interconnected by the rod elements 42" in relation to the embodiment shown in FIG. 11 is disclosed in detail. In general, it is meant to refer to the fact that the interconnection between the two main portions of the filling unit is provided by the rod elements (an interconnection is needed so that the container adapted for collecting the mixed fluid can be encompassed by these parts). The neck portion 40 and the base portion 44 are also required to be configured in a mutually moveable manner. As it will be shown below, in the embodiment illustrated in FIG. 11, moveability is provided for by the manner of arrangement of the rod elements 42. However, moveability can be ensured in a number of other ways.

As it is shown in FIG. 11, the body 83 of the support element 86—which is a bit narrower than the neck portion thereof—is fitted into an indentation of a base portion component 81 of the base portion 44 such that the shoulder of the support element 86 is seated on the rim of the indentation, while there is also sufficient space for the heads of the screws 99 protruding into the indentation. This configuration facilitates vibration transfer in the case a shaker engine 115 (vibrator engine) is applied, i.e. the base portion component 81 is essentially a vibration transfer element between the base portion housing 85 and its portions and the support element 86.

In the arrangement according to FIG. 11 a respective rod guide element 94 (stem positioning member) is arranged on each rod element 42 along the base portion component 81. The rod guide elements 94 have a shoulder part 89 that is seated against a support insert 84 pulled on the rod elements 42 (see also FIG. 14). The shoulder parts 89 are kept in place by the rim of the base portion housing 85 extending over them. Accordingly, the rod elements 42 are guided by the rod guide elements 94 by being supported against the base portion component 81 and being kept in place by the base portion housing 85.

As shown in FIG. 11, in this embodiment

- the rod elements 42 are arranged to extend into the base portion 44 and to be movable relative to it (in this embodiment, however, the rod elements 42 are fixedly mounted to the neck portion 40),
- each rod element 42 has a first rod portion guided in the base portion 44 by a first guide element, a second rod portion guided by a second guide element, and a rod element shoulder part 82 arranged between the first rod portion and the second rod portion, and
- it further comprises a respective resilient element 80 (spring) arranged to encompass the second rod portion of each rod element 42 such that it is supported against the side of the rod element shoulder part 82 which faces the neck portion 40 and against the first guide element situated opposite to this side of the rod element shoulder part 82 (with the resilient elements/springs being kept in place by through tensioning).

In the embodiment of FIG. 11, the movability of the rod elements 42 relative to the base portion 44 is ensured as follows. The rod elements 42 are passed through a support insert 84 held fixed relative to the base portion 44 (of the components of the base portion 44, the former functions as a first guide element), and their ends extend into bores 96 of a base disc 97 (base platform, see FIG. 13), wherein they are guided (thereby the base disc functions as a second guide element). Therefore, each rod element 42 is guided in the base portion 44 along two separate sections, while being moveable with respect to it, and with the guiding relation also the direction of its displacement is defined. According to the above, the rod elements 42 are divided into two rod portions by the rod element shoulder part 82, with the rod elements being guided along both portions, thereby providing that they are guided along two sections. Thanks to the rod element shoulder part 82 it is also provided that the rod elements 42 cannot be pulled out from the base portion 44 (from the guide elements).

Thanks to the way they are arranged, the resilient elements 80 provide that the neck portion 40 can be distanced—by compressing the resilient element 80—from the base portion 44 applying a gradually increasing force, while also providing that in a state wherein the container 25 is not inserted the neck portion 40 is retracted towards the base portion 44 (as much as it is allowed by the rod element shoulder part 82 functioning in this case as a stop piece), and that, when the container 25 is present, it is essentially "clamped" between the neck portion 40 and the base portion 44.

Thanks to that, the neck portion 40 can be pulled away from the base portion 44, and the container 25 can be inserted between them. It is provided by the dimensions of the resilient element 80 assumed in its compressed state, and by the length of the bores 96 (passages), that the rod portion extending into the base disc 97 cannot come out from the bore 96 and the guiding relation is preserved.

As shown in FIG. 11, in this embodiment a shaker engine 115 (vibrator engine) adapted for vibrating at least the portion of the base portion 44 adapted for being in contact with the collector container 25 (i.e. this portion is always vibrated) is arranged in the base portion 44. As shown in FIG. 11, the shaker engine 115 is preferably arranged on the support insert 84 between the two screws 99.

It has been experienced in our experiments that by this arrangement of the shaker engine 115 (and by operating it in an appropriate manner) the container 25 can be subjected to a vibration action of a sufficient magnitude, provided it is seated on the support element 86 (the same action can also be achieved by arranging the shaker engine elsewhere in the base portion 44, as its components have favourable vibration transfer characteristics). The shaker engine 115 therefore subjects the mixed fluid exiting the mixing space part to further mixing by shaking the container 25, and so the appropriate mixing of inks of different colours can be provided (i.e. a mixing of such a degree that the container 25 can be directly inserted, together with its content, into the fountain pen or another device adapted for utilizing it). It has also been found that the application of the shaker engine 115 enables that the droplets that occasionally remain on the end portion of the fluid discharge portion 55 protruding into the container 25 are directed into the container 25 from the fluid discharge portion 55.

Figure 12:
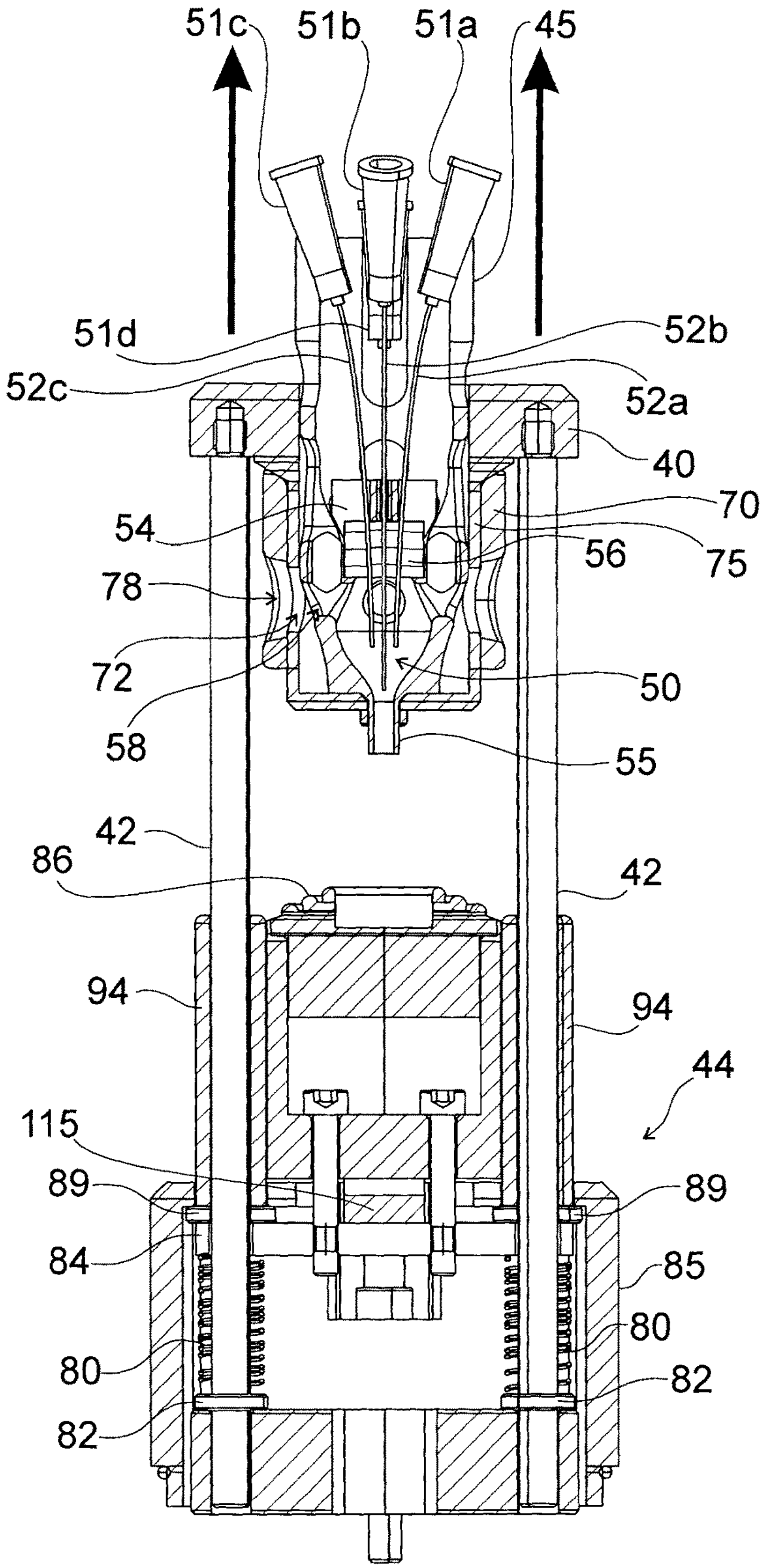
FIG. 12 is a sectional drawing illustrating the opening process of the filling unit according to FIG. 11, FIGS. 13-16 show views illustrating the assembly process of the filling unit of FIG. 11.

It is also shown in FIG. 11 that, thanks to the arrangement of the container 25, the resilient elements 80 are compressed, with the rod element shoulder parts 82 being distanced from the base disc 97. FIG. 12 illustrates the state wherein the container 25 is not present; in this case the neck portion 40 lays closer to the base portion 44 than in the state shown in FIG. 11. Besides that, the rod element shoulder parts 82 are pressed down on the base disc 97 by the resilient elements 80. The arrows shown in the upper part of FIG. 12 indicate that by moving the neck portion 40 in a direction pointing away from the base portion 44 the components can be distanced from each other such that the container 25 can be inserted. In FIG. 11 therefore the resilient elements 80 are kept in a compressed state by the container 25 because it prevents the neck portion 40 and the base portion 44 from coming closer to each other, and thus also prevents the rod element from being drawn further inside the base portion 44. The empty container (cartridge) is therefore typically rotated into place by manual operation. The empty cartridge can be inserted by manually opening the casing biased applying the resilient element 80 (spring). When thereafter the neck portion 40 (cap portion) is lowered back, the bias force provides that the cartridge is securely retained during the ink mixing process. In order to remove the cartridge containing the prepared mixture, the apparatus has to be opened in a similar manner, by grabbing the neck portion 40. The configuration has the particularly preferable feature that in the example the components adapted for conveying and storing coloured fluids are arranged at visible locations, and so—provided that the tube elements (or at least the visible tube element portion and the container) have transparent walls—the mixing process can be followed spectacularly all along.

The mode of assembly of the base portion 44 and the components attached thereto is illustrated in FIGS. 13-16. These components are shown above one another, in a disassembled state, in FIG. 13.

Figure 13:
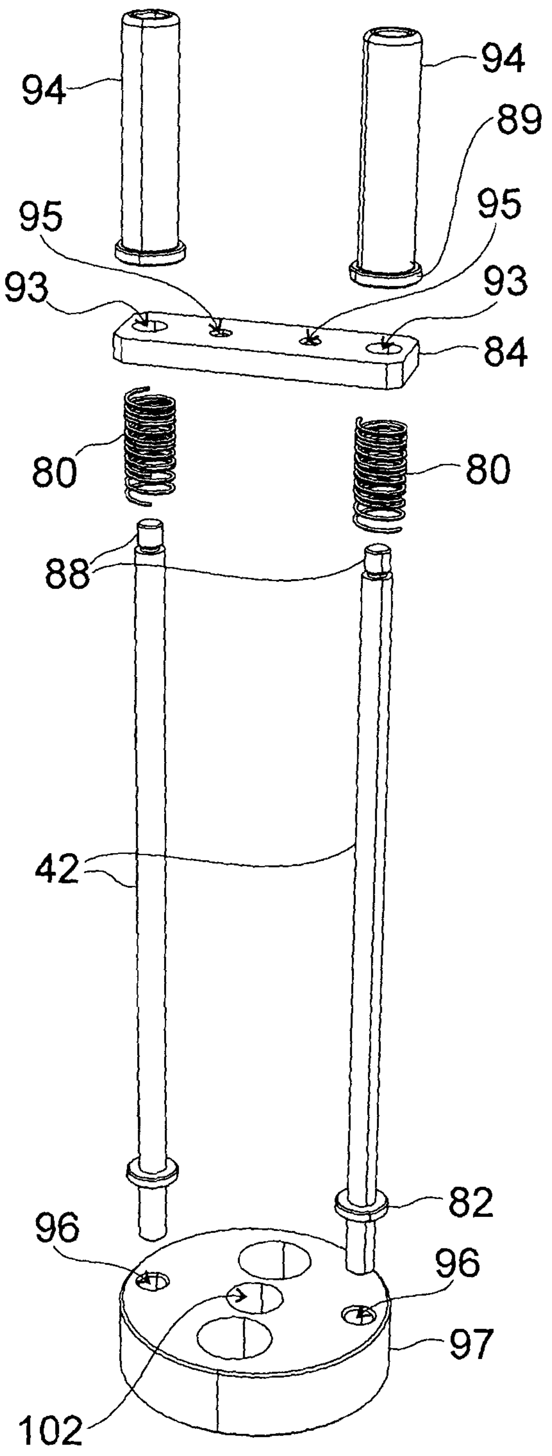

The bores that can be seen beside the middle region in FIG. 13 are configured for receiving screws adapted for securing the base disc 97 to the cover plate 36 (in order to retain the screw head, they expediently narrow down at the bottom).

Figure 14:
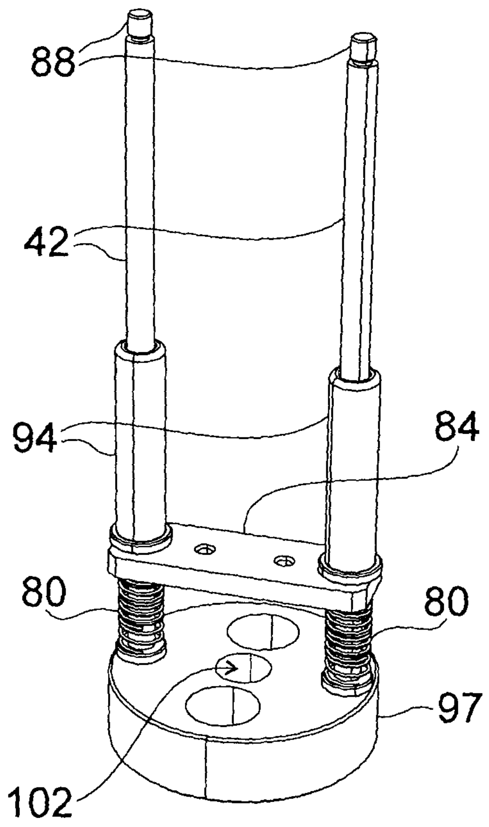

The configuration of the rod elements 42 can also be observed in FIG. 13, showing also the rod element shoulder part 82 and the threaded end 88. As shown in FIG. 13, the bottom portion (according to the figure) of the rod elements 42 (this is the second rod portion) can be inserted by sliding into the bores 96 disposed in the base disc 97. The height of the base disc 97 essentially corresponds to the length of the second rod portion (see also FIG. 11: it is even a bit shorter so that it does not extend further than it should). The bores 96 preferably lead through the base disc 97. In FIG. 13 it is also shown that first resilient elements 80, then a support insert 84, and finally the rod guide elements 94 can be pulled over the rod elements 42. FIG. 14 shows the assembled state of the components shown in FIG. 13.

Figure 15:
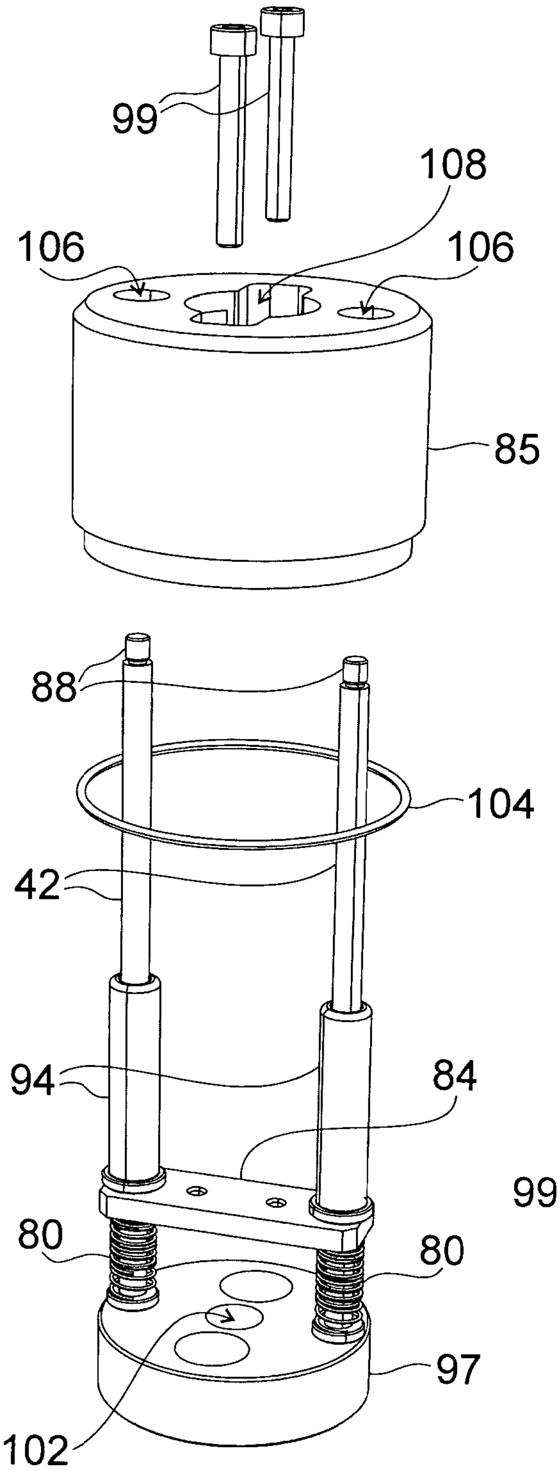

Further steps of the assembly process are shown in FIG. 15. A sealing ring 104 is shown in FIG. 15 that is preferably pulled on the narrower bottom portion of the base portion housing 85 such that the filling unit 10 can be affixed to the holding table 20 in a sealed (i.e. close-fitting) manner. The base portion housing 85 shown at the top of FIG. 15 can be pulled on the rod elements 42. The main portion of the rod guide elements 94 can be passed through the dedicated passages 106, but the shoulder parts 89 thereof cannot: it is precisely the base portion housing 85 that keeps the shoulder parts 89 in place (see also FIG. 16).

Figure 16:
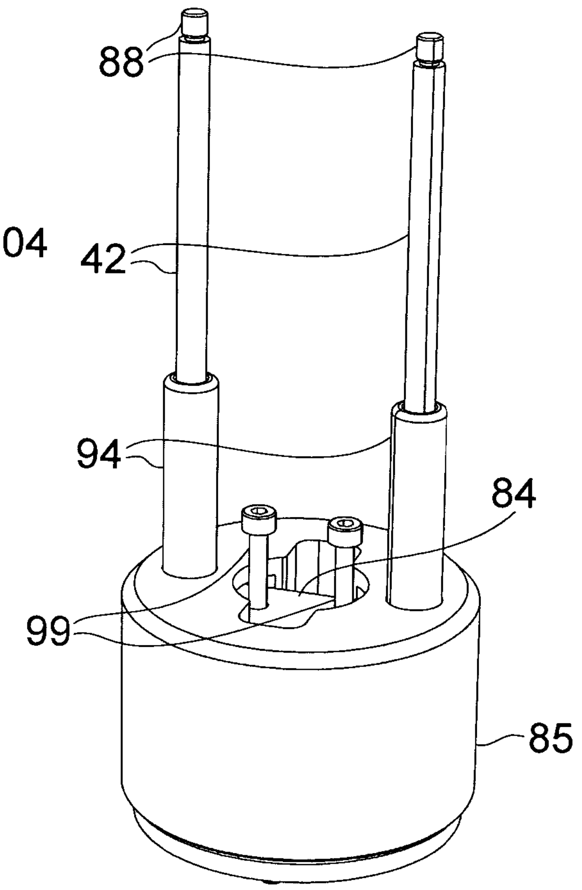

Also screws 99 are shown in FIG. 15 that can be screwed in in a manner shown in FIG. 16. The screws 99 are adapted to mount the support insert 84 to the base portion component 81 as shown in FIG. 11, so the screws 99 also have to be passed through the base portion component 81 before screwing in the screws 99 as indicated in FIG. 16. The screws 99 are adapted for pulling the support insert 84 and the base portion component 81 together as shown in FIG. 11. The underside of the base portion component 81 is seated on the base portion housing 85 such that the rod guide elements 94 are also retained by the screws 99 via the shoulder parts 89 by way of pressing down on the base portion housing 85.

FIG. 17A is primarily aimed at presenting the arrangement of the tube elements (and of a control unit 210). The control unit 210 (to be arranged in the electronics housing 30) is shown above the electronics housing 30. A start button 18 adapted to be attached to the electronics housing 30 is also shown. The screws adapted for retaining the control unit 210 are also shown, and a connector element that is adapted for being connected to the control unit 210 can also be seen at the left side (according to the figure) of the electronics housing 30. The wirings adapted for connecting the start button 18 to the control unit 210 and the control unit 210 to the peristaltic pumps 35*a*, 35*b*, 35*c*, 35*d*, 35*e*, as well as other wires necessary for control purposes, are not shown in FIG. 17A.

Figure 17B:
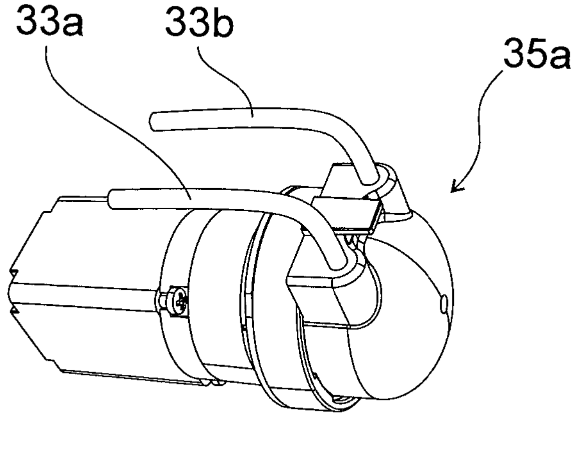
FIG. 17B shows a view of the peristaltic pump applied in the arrangement of FIG. 17A.

For the purposes of illustration, in FIG. 17A the peristaltic pumps 35*a*, 35*b*, 35*c*, 35*d*, 35*e* are shown lifted from the pump housing 32 such that the ends of the second tube element portions 14*a*, 14*b*, 14*c*, 14*d*, 14*e* leading into the pump housing 32 come into view. A pump (for example, the pump 35*a*, but the pumps 35*a*, 35*b*, 35*c*, 35*d*, 35*e* have the same configuration) is shown in an elevation drawing in FIG. 17B. It can be observed in it that each pump 35*a*, 35*b*, 35*c*, 35*d*, 35*e* has a respective inlet element 33*a* (this is the inlet stub through which the fluid is sucked in) and outlet elements 33*b* (this is the outlet stub through which the fluid is dispensed). The pumps 35*a*-35*e* are preferably implemented as peristaltic pumps provided with a stepper motor. These pumps have compact size, and the stepper motor allows for an arbitrary step size. Tubes with different diameters can even be applied for carrying coloured and colourless inks; fitting such tubes to the pump is possible. By way of example, tubes with an inside diameter of 1 mm and 2 mm, the lower-diameter (1 mm) tube being suitable for more accurate dispensing is applied for coloured inks, while the larger-diameter tube being favourable for dispensing larger amounts of fluid is applied for colourless inks (can be required in a greater amount).

As regards the pumps, it is also preferable if the brackets adapted for supporting the pumps (i.e. the components applied for positioning the pumps inside the pump housing) are implemented utilizing copper plates, and are retained in place by heat-conductive adhesive. This allows for an increased heat transfer rate in case the pumps should overheat, while the position of the motors can also be freely chosen by repositioning the adhesive.

In FIG. 17A let us first consider the tube element portions 14*a* and 15*a* of the first tube element 13*a*. The free end of a first tube element portion 15*a* that can be connected to the outlet element 38 of the first container 12*a* can be seen above the pump 35*a* (this is the first end of the first tube element portion 15*a*). The other end of the tube element portion 15*a* (i.e. the second end of the first tube element portion 15*a* that is not shown in the drawing) is connected to the inlet element of the pump 35*a*. For the purposes of illustration, the outlet element of the pump 35*a* is depicted as being free in FIG. 17A because—due to the exploded view—the end of the tube element portion 14*a* extending into the pump housing 32 (of the two ends of the second tube element portion 14*a*, the so-called third end) is pulled away from it. According to the illustration, the inward projecting end of the tube element portion 14*a* is bent back, such that it can be connected to the outlet element of the pump 35*a*. As shown, the other end of the tube element portion 14*a* that is to be inserted into the mixing space part encasing element 45 (the so-called fourth end of the tube element portion 14*a*) converges with the other tube element portion ends. The designations of the ends of the tube element portions (first, second, third, fourth) are given as above for all tube element portions.

The first tube element portion 15*b* and second tube element portion 14*b* of the second tube element 13*b* are laid in a similar manner (the portion of the tube element portion 15*b* to be connected to the container is slightly obstructed).

The pump 35*e* (the third in the row) is arranged in the same way as the pumps 35*a* and 35*b*. As indicated by its designation, in this embodiment the pump 35*e* is adapted for dispensing fluid from the container holding colourless fluid. Accordingly, the free end of the first tube element portion 15*e* of the fifth tube element 13*e* does not extend upwards, but towards the spatial region between the electronics housing 30 and the pump housing 32, where the container holding the colourless fluid is preferably arranged (see FIGS. 2 and 19A), to allow for that, a notch is made in the side of the pump housing 32. The second tube element portion 14*e* is bent back in the pump housing 32 like the tube element portions 14*a* and 14*b*.

The pumps 35*c* and 35*d* are arranged in a reversed manner relative to the pumps 35*a*, 35*b*, and 35*e*, i.e. the inlet elements and the outlet elements face left rather than right (as such directions are shown in the figure). Accordingly, these pumps 35*c*, 35*d* have their inlet element arranged at the top, and their outlet element arranged at the bottom. The first tube element portion 15*c* of the third tube element 13*c* is shown above the pump 35*c*, its free end leading into the corresponding container. The end of the second tube element portion 14*c* leading into the pump housing 32 is also bent back, but differently, because these portions have to lead to the bottom stubs. The first tube element portion 15*d* and second tube element portion 14*d* of the fourth tube element 13*d*, and the fourth pump 35*d* associated therewith have a similar arrangement.

Figure 18:
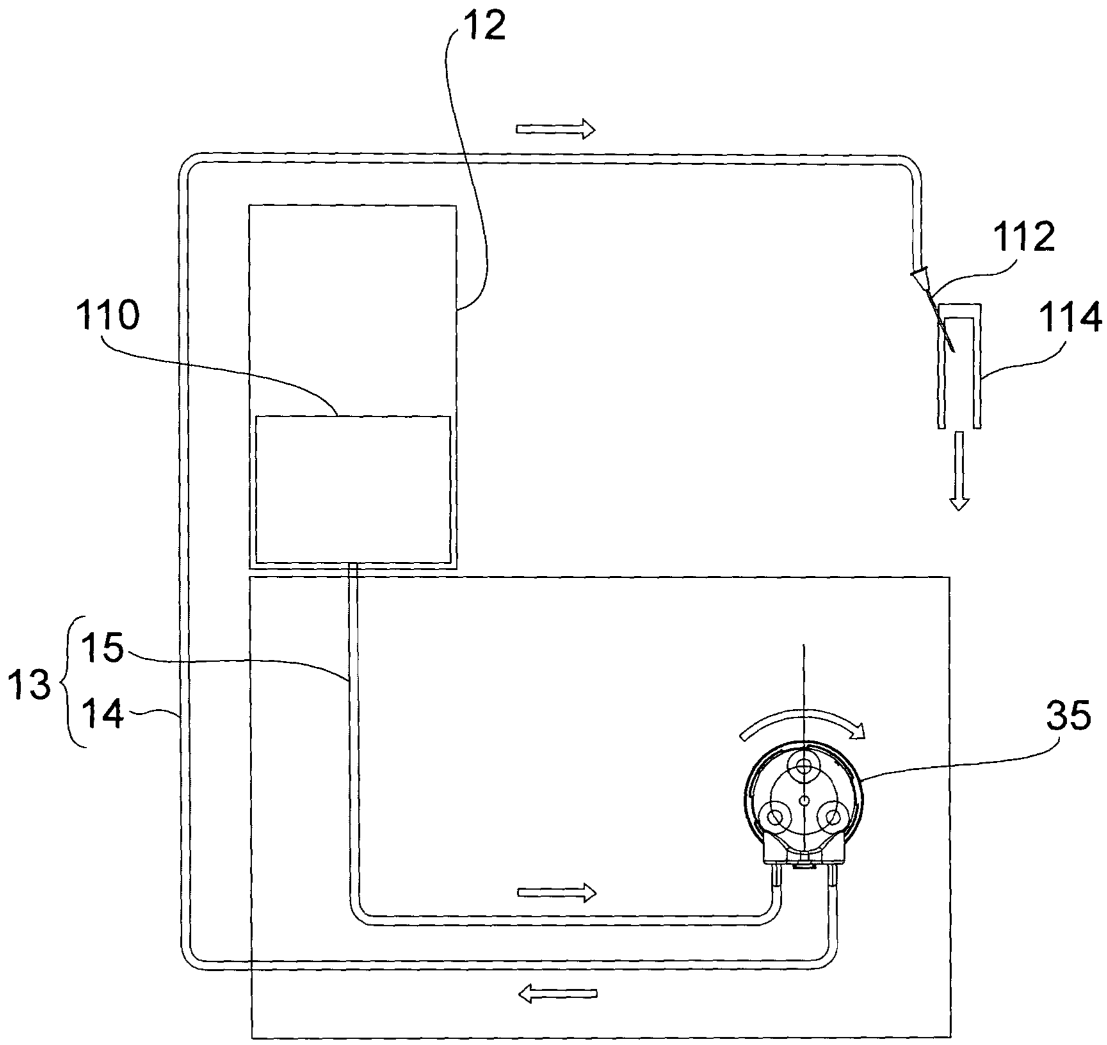
FIG. 18 is a schematic view illustrating the operation of an embodiment of the mixing apparatus according to the invention.

In FIG. 18 a simplified conceptual drawing is shown that illustrates the fluid dispensing process. In FIG. 18 a container 12 is shown in which a fluid 110 is also shown. A first tube element portion 15 (made preferably of a silicone material) is shown that is connected to the bottom of a container 12; it is connected to the inlet of a peristaltic pump 35 (the flow direction is indicated by an arrow above the tube element 15). A second tube element portion 14 (made preferably of PVC, polyvinyl chloride, of the two tube element portions, only this one can be seen, its material can be chosen freely, irrespective of the material of the other tube element portion) is connected to the inlet of the pump 35, with the fluid flow direction therein also being shown. The silicone tube has, for example, a matte colour, and is highly flexible; preferably this type is applied only in the pump housing containing the pumps, i.e. it is utilized for making connections between the ink containers and the pumps. This is preferable because during the assembly process of the apparatus the tubes exhibit a much lower mechanical resistance, i.e. the assembly of the apparatus is easier. PVC tubes are transparent (water-clear), and much more rigid compared to silicone tubes. For aesthetic reasons these tubes are applied in the visible portions (between the pumps and the dispensing end portions), while at the same time their rigidity is advantageous from the aspect of routing them (they do not move or bend uncontrollably), and their application is also preferable from the aspect of durability.

The tube element portions 14 and 15 collectively constitute the tube element 13. A dispensing needle 112 adapted to lead into the mixing space part 114 and feed the fluid 110 therein is connected to the end of the tube element portion 14 laying opposite the pump 35.

Figure 19B:
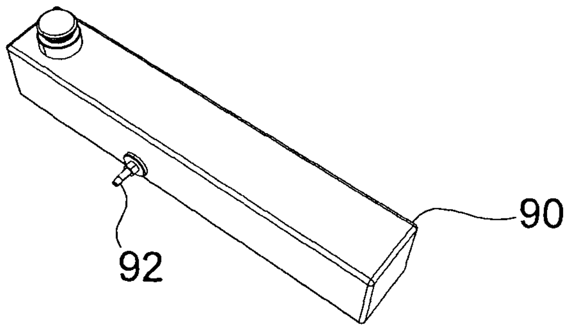
FIG. 19B is a view showing the container comprising colourless fluid.

In FIG. 19A, certain components of the embodiment according to FIG. 1 are also shown in an exploded view. Under the cover plate 36 there is shown the container 90 that is also shown in FIG. 2, and essentially has a prismatic shape. As it was also referred to above, in the illustrated embodiment (that is adapted for mixing inks) the container 90 preferably holds colourless ink. The filling opening 91 of the container 90 can be fitted against the opening of the cover plate 36 shown above the container 90, and the filling opening 91 can be closed by the cover element 27. In FIG. 19A also the containers 12*a*, 12*b*, 12*c*, 12*d* are shown disassembled (cf. FIG. 2B), with the connection element 39 shown in FIG. 2B remaining in the cover plate 36. In FIG. 19B the container 90 is also shown separately (rotated relative to the view of FIG. 19A), so an outlet element 92 thereof (to which the tube element portion 15*e* can be connected) can be seen.

In summary, the illustrated embodiment is suited for performing the following tasks and functions:

- preparing a selected colour by mixing the following 5 ink types available to it: C, M, Y, K, colourless,
- improving the rate and efficacy of mixing of the inks applying a shaker engine,
- storing continuously the initial ink colours.

In addition to that, it comprises light weight, primarily glass and aluminium components. For example, the portions of the holding table excluding the cover plate can be made of aluminium.

The invention is, of course, not limited to the preferred embodiments described in details above, but further variants, modifications and developments are possible within the scope of protection determined by the claims.

LEGENDS

10 filling unit
11 container wall
12*a* (first) container
12*b* (second) container
12*c* (third) container
12*d* (fourth) container
12 container
13*a* (first) tube element
13*b* (second) tube element
13*c* (third) tube element
13*d* (fourth) tube element
13*e* (fifth) tube element
13 tube element
14*a* (second) tube element portion (of first tube element)
14*b* (second) tube element portion (of second tube element)
14*c* (second) tube element portion (of third tube element)
14*d* (second) tube element portion (of fourth tube element)
14*e* (second) tube element portion (of fifth tube element)
14 (second) tube element portion
15*a* (first) tube element portion (of first tube element)
15*b* (first) tube element portion (of second tube element)
15*c* (first) tube element portion (of third tube element)
15*d* (first) tube element portion (of fourth tube element)
15*e* (first) tube element portion (of fifth tube element)
15 (first) tube element portion
16 container cover
17 fixation element
18 start button
19 air flow passage
20 holding table
22 holding element
25 container
26 fixing element
27 cover element
28 holder opening
29 screw element
30 electronics housing
31 holder trough
32 pump housing
33*a* inlet element
33*b* outlet element
34 support plate
35 (peristaltic) pump
35*a* (first peristaltic) pump
35*b* (second peristaltic) pump
35*c* (third peristaltic) pump
35*d* (fourth peristaltic) pump
35*e* (fifth peristaltic) pump
36 cover plate
37 closing end portion
38 outlet element
39 (ring shaped) connection element
40 neck portion
42 rod element
44 base portion
45 mixing space part encasing element
50 mixing space part
51*a* (first) dispensing needle connector
51*b* (second) dispensing needle connector
51*c* (third) dispensing needle connector
51*d* (fourth) dispensing needle connector
52*a* (first) dispensing needle
52*b* (second) dispensing needle
52*c* (third) dispensing needle
53 rim
54 needle guide element
55 fluid discharge portion
56 (spongy material) insert element
57 (first) opening
58 (first) air flow opening
60 (second) air flow opening
62 (third) air flow opening
64 notch
66 notch
68 passage
70 air pass control element
72 (second) through-opening
74 shoulder part
75 cylindrical portion
76 (second) opening
78 (first) through-opening
80 resilient element
81 base portion component
82 rod element shoulder part
83 (support element) body
84 support insert
85 base portion housing
86 support element
87 support element housing
88 threaded end
89 (rod guide element) shoulder part
90 (fifth) container
91 filling opening
92 outlet element
93 (third) opening
94 rod guide element
95 (fourth) opening
96 bore
97 base disc
99 screw
100 fountain pen
104 sealing ring
106 passage
108 inner space
110 fluid
112 dispensing needle

114 mixing space part
115 shaker engine
200 data entry unit
202 display
210 control unit

The invention claimed is:

1. A mixing apparatus for mixing fluids, in particular different coloured inks, the mixing apparatus comprising containers, each adapted for storing a fluid, a tube element, for each container, connected to the container and having a dispensing end portion at its end being opposite the container, and a fluid feed device adapted for dispensing fluid from the containers via the dispensing end portions, characterised by further comprising a mixing space part encasing element having a mixing space part in its inner space, and a fluid discharge portion connected to the mixing space part and adapted for discharging fluid being in the mixing space part, and the dispensing end portions of the tube elements are arranged to extend into the mixing space part, and a filling unit having a base portion and a neck portion, the neck portion is adapted for holding the mixing space part encasing element, and the base portion and the neck portion are configured to be movable relative to each other, and are adapted for encompassing a container being connectible to the fluid discharge portion.

2. The mixing apparatus according to claim 1, characterised in that a shaker engine adapted for vibrating at least the portion of the base portion adapted for being in contact with the collector container is arranged in the base portion.

3. A mixing system for mixing fluids, in particular different coloured inks, the mixing system comprising a data entry unit adapted for selecting a colour, and a control unit, characterised in that it comprises the mixing apparatus according to claim 1, and the fluid feed devices are controlled by the control unit to feed such quantities of fluids into the mixing space part that allow for mixing the colour selected on the data entry unit.

4. The mixing apparatus according to claim 1, wherein the mixing space part encasing element is in an upright position, wherein the mixing space part encasing element further comprises at least one air flow opening adapted to interconnect a portion of the inner space of the mixing space part encasing element, wherein the at least one air flow opening is contiguous with the mixing space part and a spatial region surrounding the mixing space part encasing element, and wherein the at least one air flow opening is formed on a wall of the mixing space part encasing element, and positioned above the mixing space part.

5. The mixing apparatus according to claim 4, characterised by comprising an air pass control element being rotatably arranged around the mixing space part encasing element and having at least one first through-opening, and when the air pass control element is rotated into its open position, at least one of its at least one through-openings is aligned with at least one of the at least one air openings of the mixing space part encasing element, and, when the air pass control element is rotated into its closed position, each one of the at least one air flow openings of the mixing space part encasing element is covered by the air pass control element.

6. The mixing apparatus according to claim 1, characterised in that the filling unit comprises rod elements adapted for interconnecting the base portion and the neck portion.

7. The mixing apparatus according to claim 6, characterised in that the rod elements are arranged to extend into the base portion and to be movable relative to said base portion, each rod element has a first rod portion guided in the base portion by a first guide element, a second rod portion guided by a second guide element, and a rod element shoulder part arranged between the first rod portion and the second rod portion, and wherein the mixing apparatus further comprises a respective resilient element arranged to encompass the second rod portion of each rod element such that said respective resilient element is supported against the side of the rod element shoulder part which faces the neck portion and against the first guide element situated opposite to this side of the rod element shoulder part.

8. The mixing apparatus according to claim 1, characterised in that a respective separate fluid feed device is arranged for each tube element.

9. The mixing apparatus according to claim 8, characterised in that a peristaltic pump is arranged as the fluid feed device.

10. The mixing apparatus according to claim 8, characterised in that each tube element comprises a first tube element portion having a first end and a second end, and a second tube element portion having a third end and a fourth end, and the first tube element portion is connected to the container at its first end, the dispensing end portion is formed at the fourth end of the second tube element portion, and the fluid feed device is connected to the second end of the first tube element portion and to the third end of the second tube element portion.

11. The mixing apparatus according to claim 1, characterised in that as the dispensing end portion of each tube element a respective dispensing needle having an internal fluid channel with an end aperture opening into the mixing space part is arranged.

12. The mixing apparatus according to claim 11, characterised in that the containers comprise a container adapted for storing colourless fluid, and containers adapted for storing coloured fluids, and the end aperture of the dispensing needle corresponding to the container adapted for storing the colourless fluid is situated closer to the fluid discharge portion than the end apertures of the dispensing needles corresponding to the containers adapted for storing the coloured fluids.

13. The mixing apparatus according to claim 11, characterised in that a spongy material insert element is arranged in the mixing space part encasing element, and the dispensing needles passed through the spongy material insert element extend into the mixing space part.

14. The mixing apparatus according to claim 13, characterised in that the spongy material insert element is arranged in a receiving portion fitting to the shape of the spongy material insert element, and a needle guide element adapted for guiding the dispensing needles is arranged fitted against the side of the spongy material insert element being opposite the mixing space part.

15. The mixing apparatus according to claim 11, characterised in that the end apertures of the internal fluid channels of the dispensing needles are situated at a distance of at least 1.25 mm.

16. The mixing apparatus according to claim 15, characterised in that the end apertures of the internal fluid channels of the dispensing needles are situated at a distance of at least 1.75 mm from one another.

* * * * *